United States Patent
Stanley et al.

(10) Patent No.: US 10,266,248 B2
(45) Date of Patent: Apr. 23, 2019

(54) LEADING EDGE SYSTEMS AND METHODS FOR AEROSPACE VEHICLES

(71) Applicant: The Boeing Company, Chicago, IL (US)

(72) Inventors: Daniel C. Stanley, Ballwin, MO (US); John S. Kruse, Florissant, MO (US); Jonathan D. Embler, Tustin, CA (US); Jeremy N. O'Hara, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 235 days.

(21) Appl. No.: 15/215,559

(22) Filed: Jul. 20, 2016

(65) Prior Publication Data

US 2018/0022439 A1    Jan. 25, 2018

(51) Int. Cl.
| | | |
|---|---|---|
| *B64C 3/36* | (2006.01) | |
| *B64C 3/18* | (2006.01) | |
| *B64C 39/02* | (2006.01) | |
| *B64G 1/58* | (2006.01) | |
| *B64C 1/38* | (2006.01) | |

(52) U.S. Cl.
CPC .................. *B64C 3/36* (2013.01); *B64C 1/38* (2013.01); *B64C 3/182* (2013.01); *B64C 3/185* (2013.01); *B64C 3/187* (2013.01); *B64C 39/024* (2013.01); *B64G 1/58* (2013.01)

(58) Field of Classification Search
CPC ......... B64C 3/36; B64C 39/024; B64C 3/187; B64C 3/185; B64C 3/182; B64C 1/58; B64G 1/58; B64G 1/46; B32B 3/14; B05D 1/36; F28F 13/00
See application file for complete search history.

(56) References Cited

U.S. PATENT DOCUMENTS

| | | | | |
|---|---|---|---|---|
| 3,114,524 A | * | 12/1963 | Conn, Jr. .................. | B64C 3/00 244/117 A |
| 3,128,067 A | * | 4/1964 | Loegering ................. | B64C 3/14 244/117 A |

(Continued)

OTHER PUBLICATIONS

Extended European Search Report, dated Oct. 16, 2017, for Counterpart EP Application No. 17181831.3, Applicant The Boeing Company, 10 pages.

(Continued)

*Primary Examiner* — Assres H Woldemaryam

(57) ABSTRACT

There is provided a leading edge system for an aerospace vehicle. The leading edge system has at least one structural member. The leading edge system further has a plurality of removable modules removably attached to the at least one structural member. Each removable module has a hollow box substructure and at least one flange portion disposed along a first end of the hollow box substructure. The leading edge system further has a plurality of first attachment elements configured for attaching the at least one flange portion of the removable module to a first end portion of the at least one structural member. The leading edge system further has a plurality of second attachment elements configured for attaching a second end of the hollow box substructure opposite the flange portion, to a second end portion of the at least one structural member opposite the first end portion.

21 Claims, 17 Drawing Sheets

(56) References Cited

U.S. PATENT DOCUMENTS

| | | | | |
|---|---|---|---|---|
| 4,124,732 A | | 11/1978 | Leger | |
| 4,344,591 A | * | 8/1982 | Jackson | B64C 1/38 244/132 |
| 5,000,998 A | * | 3/1991 | Bendig | B32B 3/12 156/153 |
| 5,560,569 A | * | 10/1996 | Schmidt | B64G 1/50 244/117 A |
| 5,772,154 A | | 6/1998 | Stewart | |
| 6,419,189 B1 | * | 7/2002 | DiChiara, Jr. | B64C 5/00 244/123.1 |
| 6,497,390 B1 | * | 12/2002 | Fischer | B32B 5/28 244/171.7 |
| 6,676,077 B1 | * | 1/2004 | DiChiara, Jr. | B64C 5/00 244/117 R |
| 8,057,189 B2 | * | 11/2011 | Riahi | F03D 1/0675 416/224 |
| 8,070,100 B2 | * | 12/2011 | Douglas | B64C 3/185 244/123.1 |
| 8,147,943 B1 | * | 4/2012 | Byrd | B64G 1/58 244/121 |
| 8,844,877 B1 | * | 9/2014 | Driemeyer | B64C 1/38 244/117 A |
| 9,028,629 B2 | * | 5/2015 | Fracchia | B32B 7/12 156/249 |
| 2007/0292654 A1 | * | 12/2007 | Bohner | B64G 1/14 428/76 |
| 2008/0176020 A1 | * | 7/2008 | Heng | B32B 18/00 428/49 |
| 2010/0028074 A1 | * | 2/2010 | Etling | B64G 1/58 403/24 |
| 2010/0095626 A1 | * | 4/2010 | Embler | B64C 1/40 52/506.05 |
| 2010/0178457 A1 | * | 7/2010 | Pinney | B64G 1/58 428/137 |
| 2011/0088856 A1 | * | 4/2011 | Chen | B64G 1/58 160/371 |
| 2016/0046396 A1 | * | 2/2016 | Pinney | B64G 1/58 165/135 |
| 2016/0059970 A1 | * | 3/2016 | Embler | B29C 44/18 220/560.08 |
| 2016/0362199 A1 | * | 12/2016 | Best | B64G 1/58 |

OTHER PUBLICATIONS

Russia Federal Institute of Industrial Property (FIPS) Examination Search Report, dated Jun. 5, 2018, for Counterpart Russian Application No. 2017113729/11, Applicant The Boeing Company, 13 total pages, including both English translation version and Russian version.

European Patent Office Examination Report, dated Aug. 14, 2018, for Counterpart EP Application No. 17181831.3, Applicant The Boeing Company, 5 pages.

* cited by examiner

LEADING EDGE SYSTEMS AND METHODS FOR AEROSPACE VEHICLES

BACKGROUND

1) Field of the Disclosure

The disclosure relates generally to systems and methods for aerospace vehicle parts, and more particularly, to systems and methods relating to leading edges of aerospace vehicles, such as spacecraft, aircraft, hypersonic vehicles, unmanned aerial vehicles (UAVs), missiles, and other aerospace vehicles.

2) Description of Related Art

Aerospace vehicles travelling through Earth's atmosphere and through space may be exposed to extreme temperatures or environmental events which may adversely affect leading edges of the wings, tail, or other surfaces of the aerospace vehicle. For example, aerospace vehicles, such as spacecraft, typically have a thermal protection system (TPS) that includes thermally insulative tiles to insulate the leading edges of the wings and other surfaces of the spacecraft from the environment and to radiate and reflect heat from the spacecraft. When the spacecraft re-enters Earth's atmosphere from space at hypersonic velocities (e.g., greater than Mach 5) and at very high temperatures (e.g., up to 2500° F. (degrees Fahrenheit)), such thermally insulative tiles may be damaged from hypersonic gas (e.g., air) or plasma penetration in gaps between the thermally insulative tiles, or from friction generated by contact with the passing hypersonic gas (e.g., air) or plasma. In addition, for example, aerospace vehicles, such as aircraft, may experience damage to the leading edges of the wings or other surfaces from ice impacts, lightning strikes, or other environmental events.

Known leading edge systems for aerospace vehicles are typically of a fixed installation and are not removable. With a fixed installation, the maintenance, or the repair or replacement of the damaged portions, of the leading edge of the wing or other surface of the aerospace vehicle, for example, the thermally insulative tiles or the substructure supporting the thermally insulative tiles, may require the aerospace vehicle to be grounded for long periods, such as weeks or months, depending on the extent of the maintenance, repair, or replacement needed. This may increase the costs of maintenance, repair, service, and operation of the aerospace vehicle.

Moreover, with a fixed installation, the maintenance, or the repair or replacement of the damaged portions, of the leading edge of the wing or other surface of the aerospace vehicle, may require the maintenance, repair, or replacement take place directly on the aerospace vehicle, as the leading edge systems are not individually removable and cannot be moved to a separate facility or lab. This may also increase the costs of maintenance, repair, service, and operation of the aerospace vehicle.

Further, while the aerospace vehicle is out of service during the maintenance, repair, or replacement effort, the availability of the aerospace vehicle for missions or flights is reduced.

Accordingly, there is a need in the art for improved leading edge systems and methods for aerospace vehicles that provide quick and easy maintenance, repair, replacement, service, and operation of the leading edges of the wings and other surfaces of the aerospace vehicle, at a reduced overall coast, and that provide advantages over known systems and methods.

SUMMARY

Example implementations of this disclosure provide for improved leading edge systems and methods for aerospace vehicles. As discussed in the below detailed description, embodiments of the improved leading edge systems and methods for aerospace vehicles may provide significant advantages over known systems and methods.

In one embodiment there is provided a leading edge system for an aerospace vehicle. The leading edge system comprises at least one structural member. The leading edge system further comprises one or more removable modules removably attached to the at least one structural member. Each removable module comprises a hollow box substructure and at least one flange portion disposed along a first end of the hollow box substructure.

The leading edge system further comprises a plurality of first attachment elements configured for attaching the at least one flange portion of the removable module to a first end portion of the at least one structural member. The leading edge system further comprises a plurality of second attachment elements configured for attaching a second end of the hollow box substructure opposite the at least one flange portion, to a second end portion of the at least one structural member opposite the first end portion.

In another embodiment there is provided a leading edge system for an aerospace vehicle. The leading edge system comprises at least one structural member. The leading edge system further comprises a plurality of removable modules removably attached to the at least one structural member.

Each removable module comprises a hollow box substructure having a D-box configuration, and having a flow inhibiting barrier attached to an interior central portion of the hollow box substructure. The flow inhibiting barrier forms two separate volumes within the hollow box substructure.

Each removable module further comprises at least one flange portion disposed along a first end of the hollow box substructure. Each removable module further comprises a thermal protection system (TPS) comprising at least a plurality of thermally insulative tiles coupled to an exterior of the hollow box substructure.

The leading edge system further comprises a plurality of first attachment elements configured for attaching the at least one flange portion of the removable module to a first end portion of the at least one structural member. The leading edge system further comprises a plurality of second attachment elements configured for attaching a second end of the hollow box substructure opposite the at least one flange portion, to a second end portion of the at least one structural member opposite the first end portion.

In another embodiment there is provided a method of assembling a leading edge system for an aerospace vehicle. The method comprises the step of assembling a plurality of removable modules. Each removable module comprises a hollow box substructure having a D-box configuration with a plurality of sides, a first end having at least one flange portion with a plurality of flange attachment openings, and a second end having a plurality of substructure second end attachment openings.

The method further comprises the step of providing at least one structural member disposed in the aerospace vehicle. The at least one structural member has a first end portion with a plurality of first end attachment openings, and a second end portion having an extension portion with a plurality of extension portion attachment openings.

The method further comprises the step of providing a plurality of first attachment elements, and a plurality of second attachment elements. The method further comprises the step of coupling the second end of each hollow box substructure to the second end portion of the at least one structural member, by inserting each of the plurality of second attachment elements through each of the plurality of extension portion attachment openings aligned with each of the plurality of substructure second end attachment openings.

The method further comprises the step of fastening the first end of each hollow box substructure to the first end portion of the at least one structural member, by inserting each of the plurality of first attachment elements through each of the plurality of flange attachment openings aligned with each of the plurality of first end attachment openings. The method further comprises the step of obtaining the leading edge system for the aerospace vehicle, wherein each of the plurality of removable modules is separately removable and replaceable.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate exemplary embodiments, but which are not necessarily drawn to scale, wherein.

Each figure shown in this disclosure shows a variation of an aspect of the embodiments presented, and only differences will be discussed in detail.

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and fully convey the scope of the disclosure to those skilled in the art.

Figure 1:
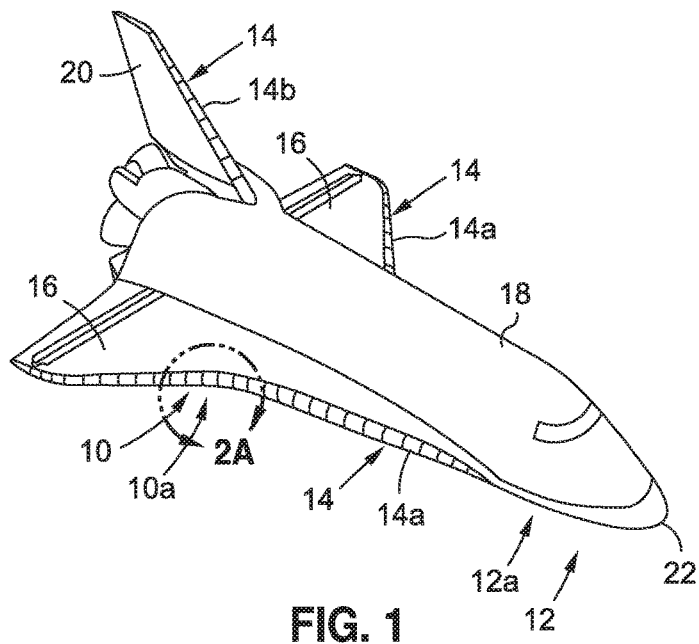
FIG. 1 is an illustration of a front perspective view of an exemplary aerospace vehicle having an exemplary embodiment of a leading edge system of the disclosure.

Now referring to the Figures, FIG. 1 is an illustration of a front perspective view of an exemplary aerospace vehicle 12, such as in the form of an aircraft 12a, having an exemplary embodiment of a leading edge system 10, such as in the form of leading edge system 10a, of the disclosure. In one embodiment, the aerospace vehicle 12 (see FIG. 1) is configured to travel at an altitude of 350,000 feet or less, and preferably, at an altitude of 150,000 feet or less, and comprises the aircraft 12a (see FIG. 1), an unmanned air vehicle (UAV) 12c (see FIG. 8), a rotorcraft 12d (see FIG. 8), a missile 12e (see FIG. 8), or another suitable aerospace vehicle 12 (see FIG. 1) configured to travel at an altitude of 350,000 feet or less, and preferably, at an altitude of 150,000 feet or less. The exemplary embodiment of the leading edge system 10, such as in the form of leading edge system 10a, does not have a thermal protection system (TPS) 77 (see FIGS. 5A-6C, 7B), and is shown in FIGS. 1-3C and 7A.

As shown in FIG. 1, the leading edge system 10, such as in the form of leading edge system 10a, is removably attached along leading edges 14, such as leading edges 14a, of wings 16, which are coupled to a body 18. The leading edge system 10 (see FIG. 1), such as in the form of leading edge system 10a (see FIG. 1), may also be attached along a leading edge 14 (see FIG. 1), such as a leading edge 14b (see FIG. 1), of a tail 20 (see FIG. 1), or other airfoil surfaces on the aerospace vehicle 12 (see FIG. 1).

In another embodiment, as shown in FIG. 4 and FIGS. 5A-6C, 7B, and discussed in detail below, the aerospace vehicle 12 (see FIG. 4) is configured to travel at an altitude of greater than 150,000 feet and includes a thermal protection system (TPS) 77 (see FIGS. 5A-6C, 7B), comprising at least a plurality of thermally insulative tiles 80 (see FIGS. 5A-5B) for use in high temperature applications, such as in a temperature range of from about 500° F. (degrees Fahrenheit) to about 2500° F., and for use in high speed, orbital, and atmospheric re-entry applications. In this embodiment, the aerospace vehicle 12 (see FIG. 4) comprises a spacecraft 12b (see FIGS. 4, 8), a hypersonic vehicle 12f (see FIG. 8), a re-entry vehicle 12g (see FIG. 8), a reusable launch vehicle (RLV) 12h (see FIG. 8), or another suitable aerospace vehicle 12 (see FIGS. 4, 8) configured to travel at an altitude of greater than 150,000 feet.

As used herein, "aerospace vehicle" may include, but is not limited to, aircraft, unmanned air vehicles (UAVs), spacecraft, rotorcraft, missiles, gliders, hypersonic vehicles, re-entry vehicles including satellites, rockets, ballistic missile payloads, a first stage low orbit space plane, and manned capsules, reusable launch vehicles (RLVs), and/or any other object that travels through airspace.

As used herein, "hypersonic vehicle" means a vehicle that travels through the atmosphere at speeds above about Mach 5. As used herein, "re-entry vehicles" may include, but are not limited to, satellites, rockets, manned and unmanned capsules, ballistic missile payloads, or other parts of a spacecraft configured to return from space through Earth's atmosphere and configured to withstand very high temperatures and very high speeds or velocities through Earth's atmosphere, and configured to protect crew members and/or instruments and equipment on the vehicle. As used herein, "reusable launch vehicle" means a vehicle that is launched into space more than once, or is capable of launching a payload into space more than once.

Figure 5A:
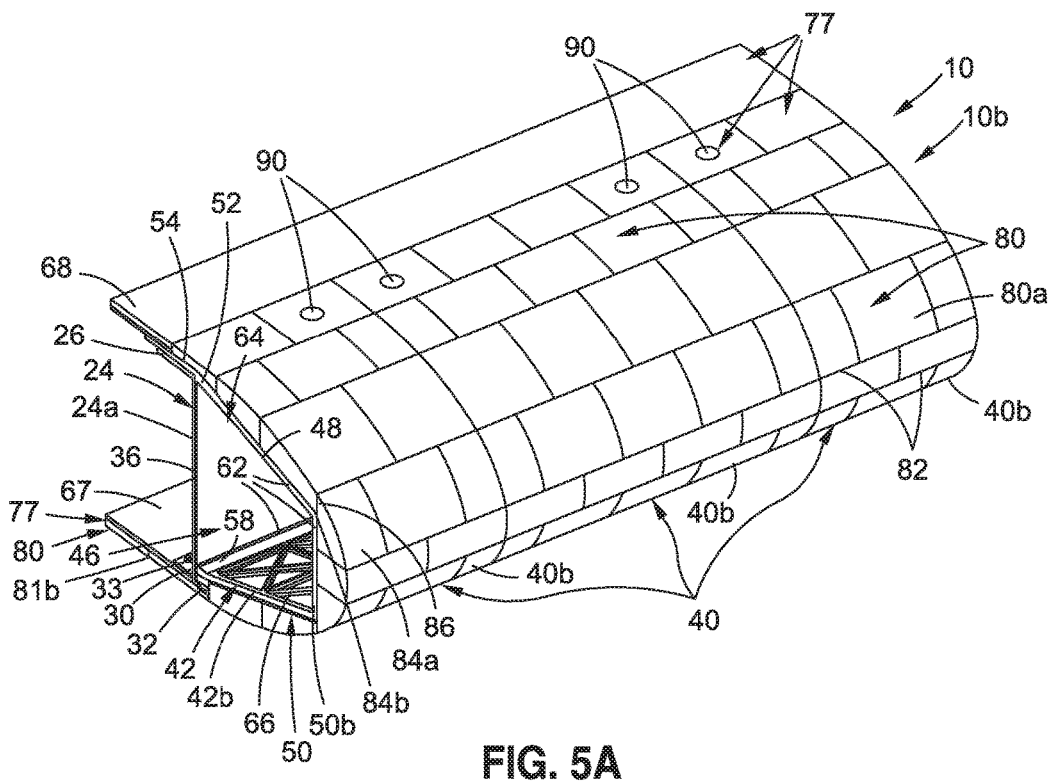
FIG. 5A is an illustration of a close-up, partial front perspective view of the leading edge of FIG. 4 showing another exemplary embodiment of a leading edge system having a thermal protection system (TPS)
Figure 5B:
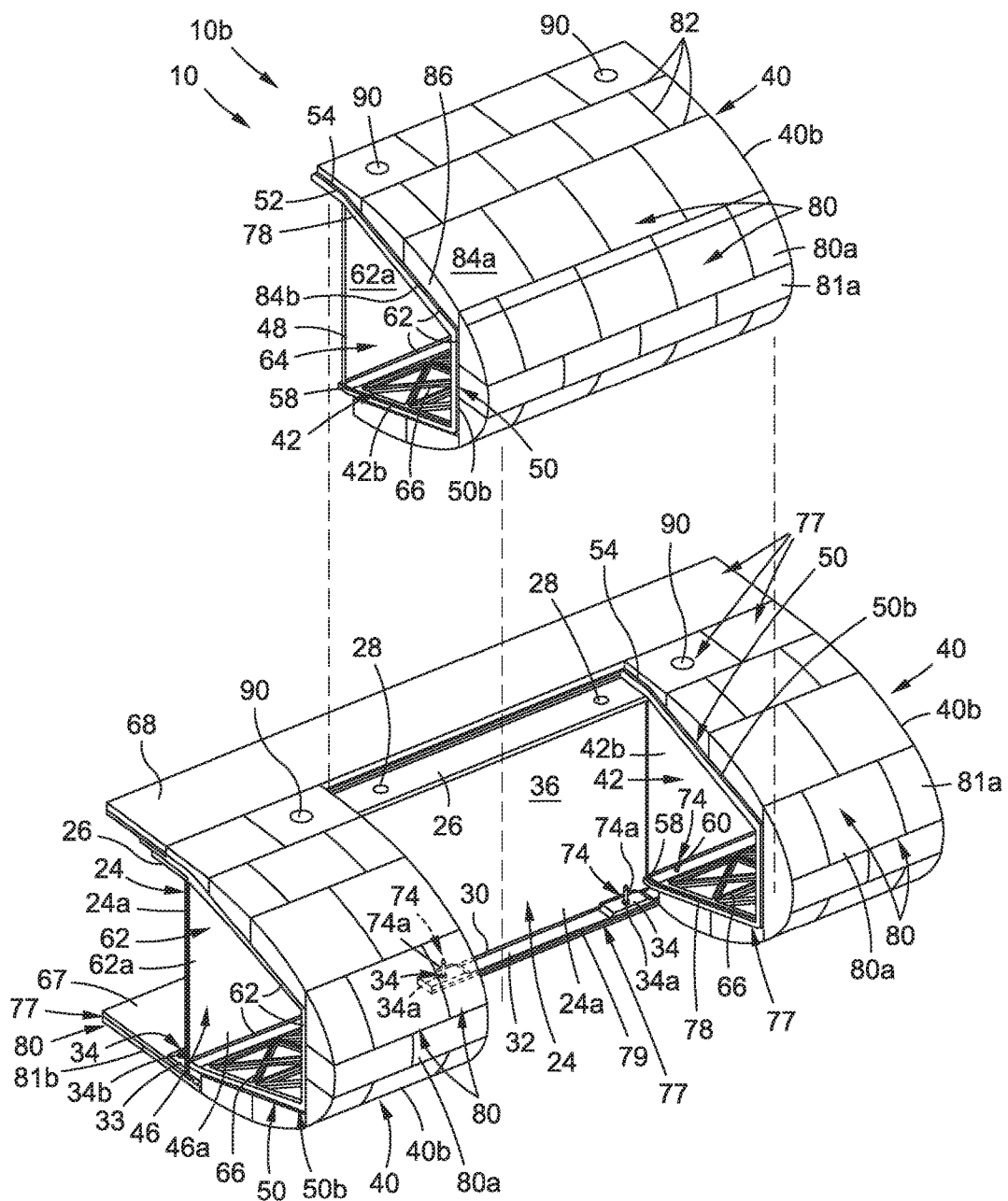
FIG. 5B is an illustration of the enlarged, partial front perspective view of the leading edge system of FIG. 5A with a removable module shown removed.

Now referring to FIGS. 2A-3C, FIGS. 2A-3C show one embodiment of the leading edge system 10, such as in the form of leading edge system 10a, intended for use on aerospace vehicles 12 (see FIGS. 1, 8) configured to travel at an altitude of 350,000 feet or less, and preferably, at an altitude of 150,000 feet or less, and that do not have a thermal protection system (TPS) 77 (see FIGS. 5A-6C, 7B), including at least a plurality of thermally insulative tiles 80 (see FIGS. 5A-5B).

Figure 2A:
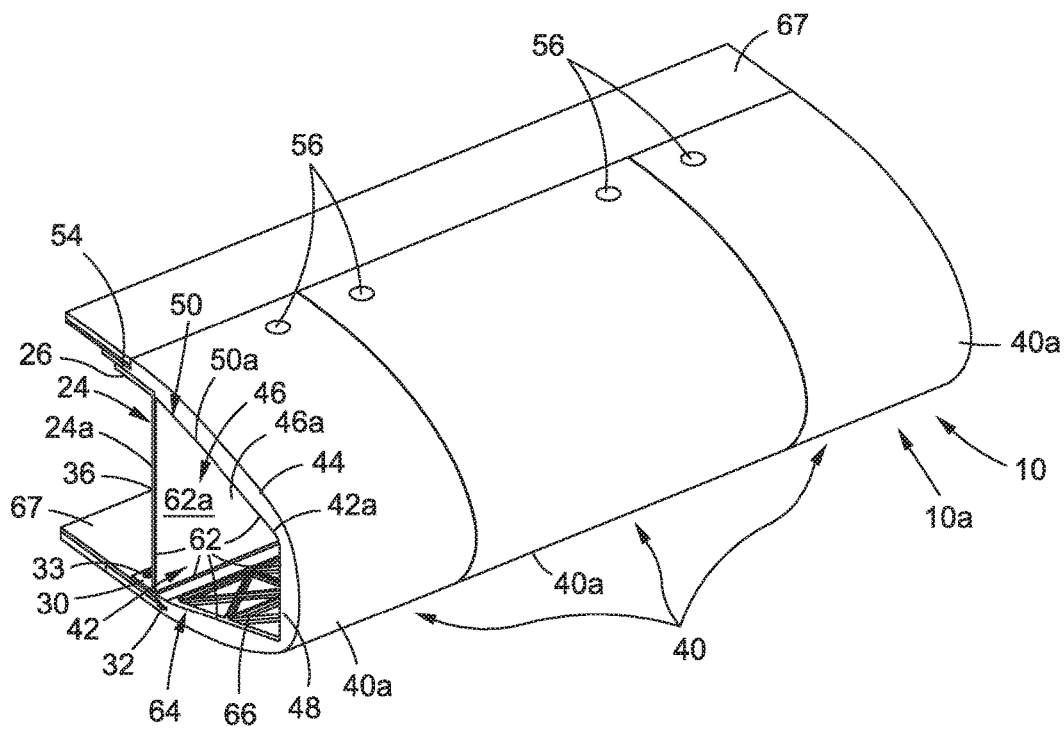
FIG. 2A is an illustration of an enlarged, partial front perspective view of the leading edge of FIG. 1 showing an embodiment of a leading edge system of the disclosure.
Figure 2B:
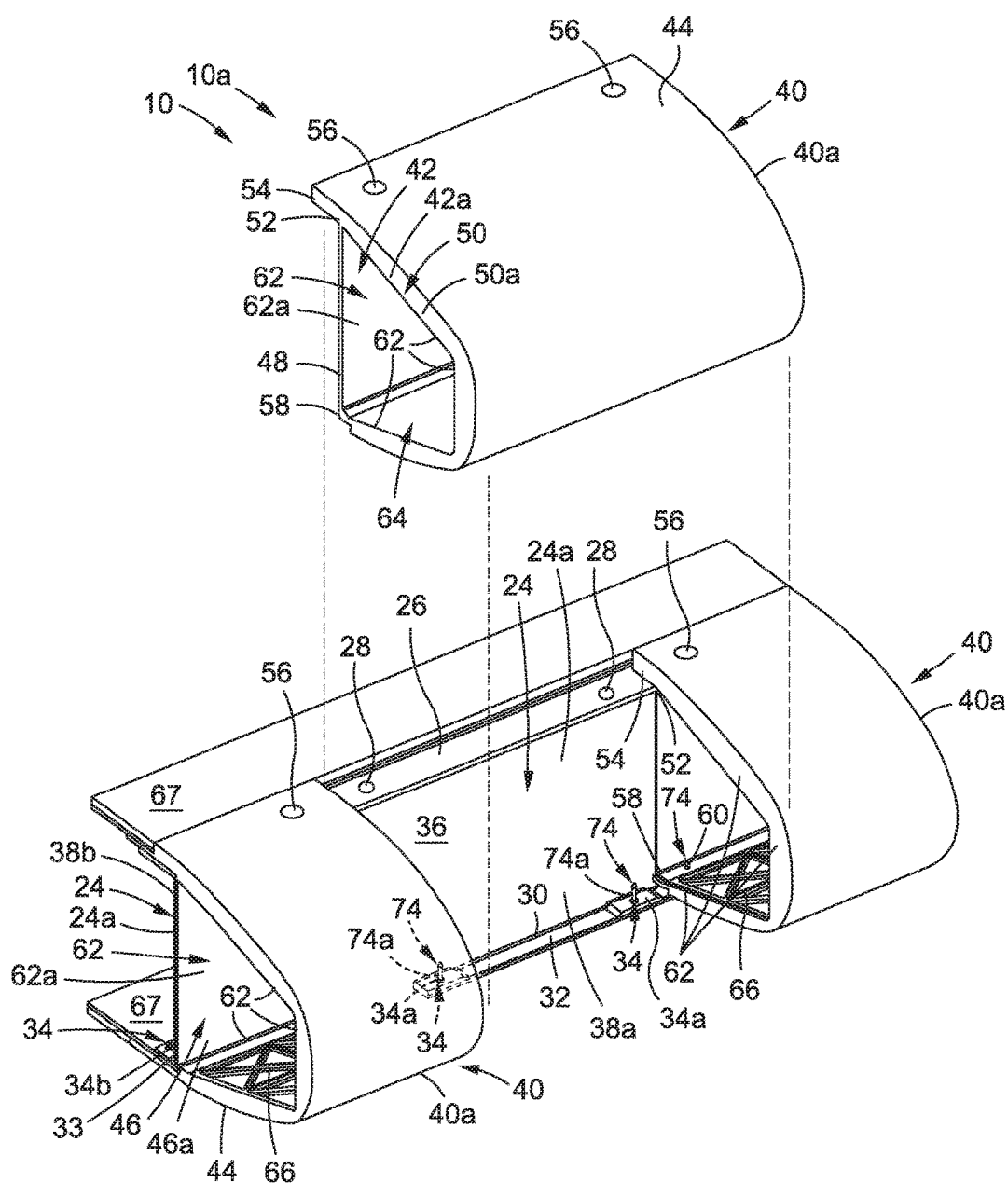
FIG. 2B is an illustration of the enlarged, partial front perspective view of the leading edge system of FIG. 2A with a removable module shown removed.
Figure 2C:
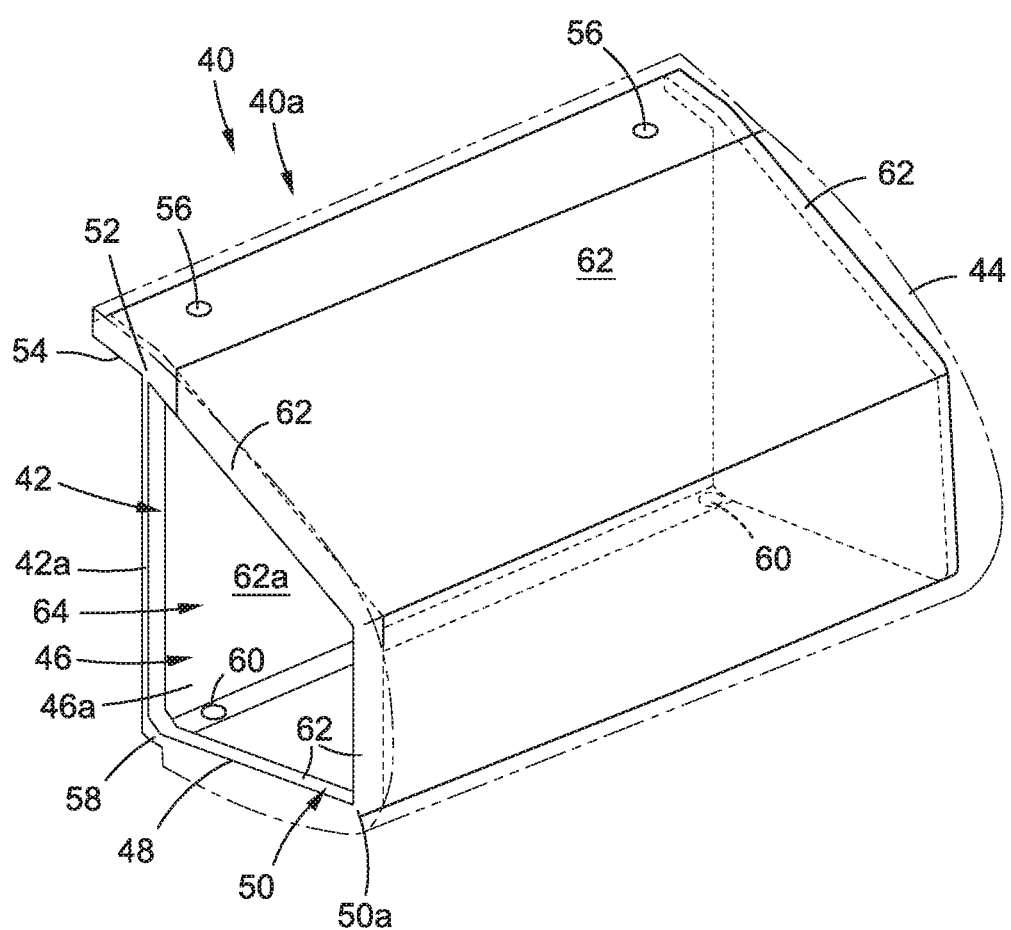
FIG. 2C is an illustration of a front perspective view of an exemplary hollow box substructure of the removed removable module of FIG. 2B.
Figure 3A:
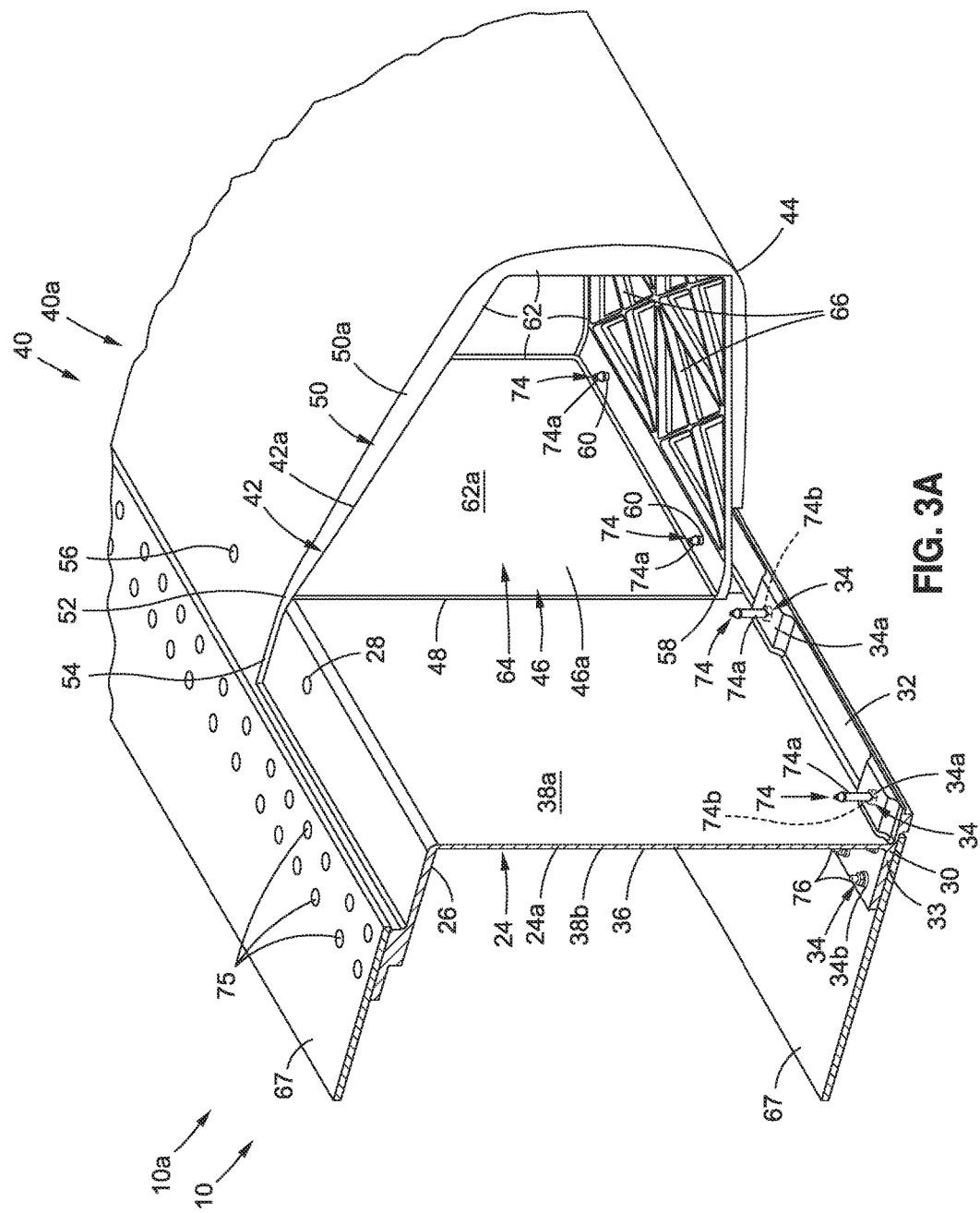
FIG. 3A is an illustration of a side perspective view of an exemplary embodiment of a leading edge system of the disclosure showing installation of the removable module independent of wing skins.

FIG. 2A is an illustration of an enlarged, partial front perspective view of the leading edge 14, such as leading edge 14a, of FIG. 1 showing an embodiment of the leading edge system 10, such as in the form of leading edge system 10a, of the disclosure. FIG. 2B is an illustration of the enlarged, partial front perspective view of the leading edge system 10, such as in the form of leading edge system 10a, of FIG. 2A with a removable module 40 shown removed. FIG. 2C is an illustration of a front perspective view of an exemplary hollow box substructure 42 of the removed removable module 40 of FIG. 2B. FIG. 3A is an illustration of a side perspective view of an exemplary embodiment of the leading edge system 10, such as in the form of leading edge system 10a, of the disclosure showing installation of the removable module 40 independent of wing skins 67.

As shown in FIGS. 2A-2B and 3A, the leading edge system 10, such as in the form of leading edge system 10a, comprises at least one structural member 24, such as in the form of a spar 24a, for example, a front spar. The structural member 24 (see FIGS. 2A-2B, 8) comprises one of, a spar 24a (see FIGS. 2A-2B, 8), a rib 24b (see FIG. 8), a stringer 24c (see FIG. 8), a beam 24d (see FIG. 8), or another suitable structural member 24 (see FIG. 8). The structural member 24 (see FIGS. 2A-2B, 3A, 8) is fixedly attached or coupled to the interior of the aerospace vehicle 12 (see FIG. 1) and may or may not be removable.

As shown in FIGS. 2A-2B and 3A, structural member 24, such as in the form of a spar 24a, comprises a first end portion 26. The first end portion 26 (see FIGS. 2A-2B, 3A) has a plurality of first end attachment openings 28 (see FIGS. 2B, 3A) formed in the first end portion 26 (see FIGS. 2A-2B, 3A). Preferably, the first end portion 26 (see FIGS. 2B, 3A) has two first end attachment openings 28 (see FIG. 2B), spaced apart from each other at opposite ends of the first end portion 26 (see FIG. 2B). However, the number of first end attachment openings 28 (see FIG. 2B) may be more than two and they may be formed in or positioned at other suitable locations along the first end portion 26.

As further shown in FIGS. 2A-2B and 3A, the structural member 24, such as in the form of a spar 24a, comprises a second end portion 30 having an extension portion 32 and an interior portion 33. The second end portion 30 (see FIGS. 2B, 3A) has a plurality of second end attachment openings 34 (see FIGS. 2B, 3A). The second end attachment openings 34 (see FIGS. 2B, 3A) comprise extension portion attachment openings 34a (see FIGS. 2B, 3A) formed in the extension portion 32 (see FIGS. 2B, 3A), and comprise interior portion attachment openings 34b (see FIGS. 2B, 3A) formed in the interior portion 33 (see FIGS. 2B, 3A).

Preferably, the extension portion 32 (see FIGS. 2B, 3A) of the second end portion 30 (see FIGS. 2B, 3A) has two extension portion attachment openings 34a (see FIGS. 2B, 3A), spaced apart from each other at opposite ends of the extension portion 32 (see FIGS. 2B, 3A). However, the number of extension portion attachment openings 34a (see FIGS. 2B, 3A) may be more than two, and they may be formed in or positioned at other suitable locations along the extension portion 32 (see FIGS. 2B, 3A). The interior portion 33 (see FIGS. 2B, 3A) of the second end portion 30 (see FIGS. 2B, 3A) preferably has two or more interior portion attachment openings 34b (see FIGS. 2B, 3A) spaced in close proximity to each other.

As further shown in FIGS. 2A-2B and 3A, the structural member 24, such as in the form of a spar 24a, comprises a body portion 36 disposed between the first end portion 26 and the second end portion 30. The body portion 36 (see FIGS. 2B, 3A) has an exterior side 38a (see FIGS. 2B, 3A) and an interior side 38b (see FIGS. 2B, 3A).

The first end portion 26 (see FIG. 3A) and the second end portion 30 (see FIG. 3A) of the structural member 24 (see FIG. 3A) are preferably each attached to a wing skin 67 (see FIGS. 2A, 2B, 3A) via a plurality of wing skin fasteners 76 (see FIG. 3A). The wing skin fasteners 76 (see FIG. 3A) may be inserted through wing skin fastener openings 75 (see FIG. 3A).

As shown in FIGS. 2A-2B and 3A, the leading edge system 10, such as in the form of leading edge system 10a, further comprises one or more removable modules 40, such as in the form of removable modules 40a, removably attached to the at least one structural member 24. Each removable module 40 (see FIGS. 2A-3A), such as in the form of removable module 40a (see FIGS. 2A-3A), comprises a hollow box substructure 42 (see FIGS. 2A-3A), such as in the form of hollow box substructure 42a. The hollow box substructure 42 (see FIGS. 2A-3A) comprises an exterior 44 (see FIGS. 2A-3A) and an interior 46 (see FIGS. 2A-3A). Preferably, the interior 46 is a hollow interior 46a (see FIGS. 2A-3A).

The hollow box substructure 42 (see FIGS. 2A-3A) has a perimeter 48 (see FIGS. 2A-3A) having a D-box configuration 50 (see FIGS. 2A-3A). In the embodiment of the hollow box substructure 42 shown in FIGS. 2A-3A, the D-box configuration 50 comprises a curved configuration 50a. In the embodiment of the hollow box substructure 42 shown in FIGS. 5A-6A, the D-box configuration 50 comprises an angled configuration 50b. However, the hollow box substructure 42 (see FIGS. 2A-3A, 5A-6A) may comprise another suitably shaped box configuration.

As shown in FIGS. 2B-3A, the hollow box substructure 42 of the removable module 40 comprises a first end 52, a second end 58, and a plurality of sides 62. Each removable module 40 (see FIGS. 2B-3A) further comprises at least one flange portion 54 disposed along the first end 52 of the hollow box substructure 42. The flange portion 54 (see FIGS. 2B-3A) comprises a plurality of flange attachment openings 56 (see FIGS. 2B-3A).

Preferably, the flange portion 54 (see FIGS. 2B-3A) has two flange attachment openings 56 (see FIGS. 2A-3A), spaced apart from each other at opposite ends of the flange portion 54 (see FIGS. 2A-3A). However, the number of flange attachment openings 56 (see FIGS. 2A-3A) may be more than two and they may be formed in or positioned at other suitable locations along the flange portion 54 (see FIGS. 2B-3A).

As shown in FIGS. 2C, 3A, the second end 58 of the hollow box substructure 42 comprises a plurality of substructure second end attachment openings 60. Preferably, the second end 58 (see FIGS. 2C, 3A) of the hollow box substructure 42 (see FIGS. 2C, 3A) has two substructure second end attachment openings 60 (see FIGS. 2C, 3A), spaced apart from each other at opposite ends of the second end 58 (see FIGS. 2C, 3A). However, the number of substructure second end attachment openings 60 (see FIGS. 2C, 3A) may be more than two and they may be formed in or positioned at other suitable locations along the second end 58 (see FIGS. 2C, 3A).

As shown in FIGS. 2A-3A, the hollow box substructure 42, such as in the form of hollow box substructure 42a, comprises a plurality of sides 62 and may comprise one or more open side portion 64. As shown in FIG. 2C, in one embodiment, the hollow box substructure 42 has one open side portion 64 and five (5) sides 62 that are closed. In another embodiment, the hollow box substructure 42 may have two open side portion 64 and four (6) sides 62 that are closed. In yet another embodiment, the hollow box substructure 42 may have six (6) sides 62 that are closed and may have no open side portions 64. A back side 62a (see FIGS. 2A, 2B, 3A) of the hollow box substructure 42 (see FIGS. 2A, 2B, 3A) is preferably adjacent the exterior side 38a (see FIG. 3A) of the body portion 36 (see FIG. 3A) of the structural member 24 (see FIG. 3A).

The hollow box substructure 42 (see FIGS. 2A, 2B, 3A) may further optionally comprise one or more substructure stiffeners 66 disposed within the interior 46 (see FIGS. 2A, 2B, 3A) of the hollow box substructure 42 (see FIGS. 2A, 2B, 3A). The substructure stiffeners 66 (see FIGS. 2A, 2B) provide additional structural integrity to the hollow box substructure 42 (see FIGS. 2A, 2B, 3A).

Figure 3B:
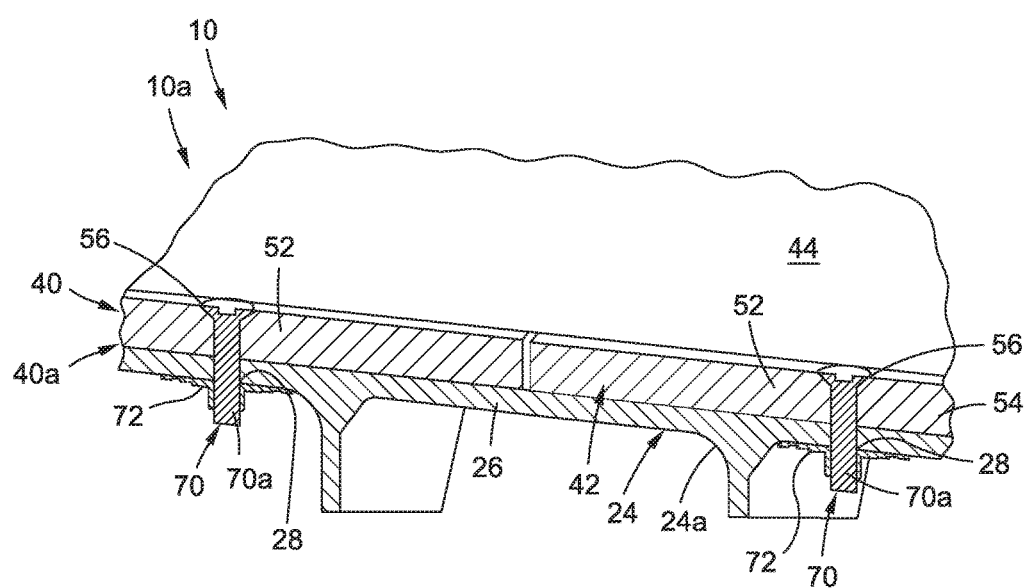
FIG. 3B is an illustration of an enlarged cross-sectional front view of an exemplary embodiment of a leading edge system of the disclosure showing first attachment elements fastening a removable module to a first end portion of a structural member.

Now referring to FIG. 3B, the leading edge system 10, such as in the form of leading edge system 10a, further comprises a plurality of first attachment elements 70 configured for attaching the at least one flange portion 54 of the removable module 40, such as in the form of removable module 40a, to a first end portion 26 of the at least one structural member 24. FIG. 3B is an illustration of an enlarged cross-sectional front view of an exemplary embodiment of the leading edge system 10, such as in the form of leading edge system 10a, of the disclosure showing the plurality of first attachment elements 70 fastening the removable module 40 to the first end portion 26 of the structural member 24.

As shown in FIG. 3B, the plurality of first attachment elements 70 each comprise a fastener 70a secured in place with a nut plate 72. The first attachment element 70 (see FIGS. 3B, 8) each comprises a fastener 70a (see FIGS. 3B, 8), a bolt 70b (see FIG. 8), or another suitable attachment element 70 (see FIG. 8). The first attachment elements 70 (see FIG. 3B) may be made of titanium, stainless steel, or another suitably hard and durable metal material.

As further shown in FIG. 3B, the plurality of first attachment elements 70 are configured to fasten the first end 52 of each hollow box substructure 42 to the first end portion 26 of the at least one structural member 24, such as in the form of spar 24a. Each of the plurality of first attachment elements 70 (see FIG. 3B) is preferably inserted through each of the plurality of flange attachment openings 56 (see FIG. 3B) and through each of the plurality of first end attachment openings 28 (see FIG. 3B).

Each flange attachment opening 56 (see FIG. 3B) is preferably aligned with each first end attachment opening 28 (see FIG. 3B). As designed, when the leading edge system 10 (see FIG. 3B), such as in the form of leading edge system 10a (see FIG. 3B), is assembled, each of the plurality of flange attachment openings 56 (see FIG. 3B) of the hollow box substructure 42 (see FIG. 3B) is preferably aligned with each of the corresponding plurality of first end attachment openings 28 (see FIG. 3B) of the first end portion 26 (see FIG. 3B) of the structural member 24 (see FIG. 3B).

Each of the plurality of first attachment elements 70 (see FIG. 3B), such as fasteners 70a (see FIG. 3B), is preferably inserted through each of the plurality of flange attachment openings 56 (see FIG. 3B) and through each of the plurality of first end attachment openings 28 (see FIG. 3B). Each flange attachment opening 56 (see FIG. 3B) is preferably aligned with each first end attachment opening 28 (see FIG. 3B). As designed, when the leading edge system 10 (see FIG. 3B), such as in the form of leading edge system 10a (see FIG. 3B), is assembled, each of the plurality of flange attachment openings 56 (see FIG. 3B) of the hollow box substructure 42 (see FIG. 3B) is preferably aligned with each of the corresponding plurality of first end attachment openings 28 (see FIG. 3B) of the first end portion 26 (see FIG. 3B) of the structural member 24 (see FIG. 3B).

Figure 3C:
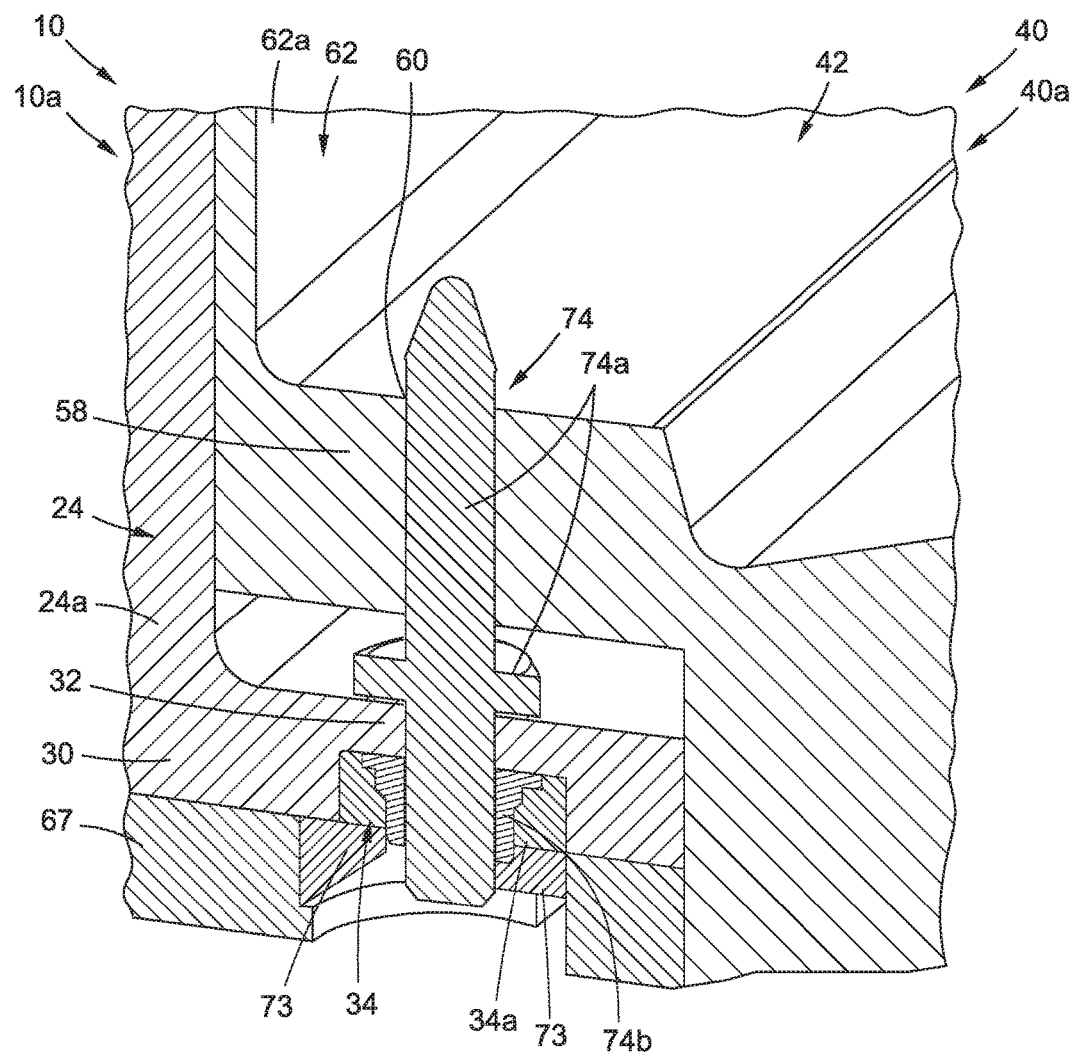
FIG. 3C is an illustration of an enlarged cross-sectional side view of an exemplary embodiment of a leading edge system of the disclosure showing a second attachment element fastening a removable module to a second end portion of a structural member.

Now referring to FIG. 3C, the leading edge system 10, such as in the form of leading edge system 10a, further comprises a plurality of second attachment elements 74 (see also FIGS. 2B, 3A) configured for attaching the second end 58 of the hollow box substructure 42 opposite the at least one flange portion 54 (see FIG. 3A), to the second end portion 30 of the at least one structural member 24, such as spar 24a, opposite the first end portion 26 (see FIG. 3A). FIG. 3C is an illustration of an enlarged cross-sectional side view of an exemplary embodiment of the leading edge system 10, such as in the form of leading edge system 10a, of the disclosure showing the second attachment element 74 fastening a removable module 40, such as in the form of removable module 40a, to the second end portion 30 of the structural member 24.

As shown in FIG. 3C, the second attachment element 74 comprises a dagger pin 74a and a dagger pin nut 74b that secures the dagger pin 74a in place. The second attachment element 74 (see FIG. 3C) may comprise other suitable attachment elements 74 as well. The second attachment elements 74 (see FIG. 3C), such as the dagger pin 74a (see FIG. 3C) and the dagger pin nut 74b (see FIG. 3C), may be made of titanium, stainless steel, or another suitably hard and durable metal material. The second attachment elements 74 (see FIG. 3C), such as in the form of dagger pin 74a (see FIG. 3C) and dagger pin nut 74b (see FIG. 3C), may be incorporated and fixed to the extension portion 32 (see FIG. 3C) of the structural member 24 (see FIG. 3C). The removable modules 40 (see FIGS. 2B, 3A) each have at least two substructure second end attachment openings 60 (see FIGS. 2C, 3A) in the second end 58 (see FIGS. 2B, 2C, 3A) rear surface of the removable module 40 (see FIGS. 2B, 3A). The at least two substructure second end attachment openings 60 (see FIGS. 2C, 3A) engage over the at least two dagger pins 74a (see FIGS. 3A), respectively, on the structural member 24 (see FIG. 3C).

When the removable module 40 (see FIGS. 2B, 3A, 3C) is removably mounted to the structural member 24 (see FIG. 3C), the removable module 40 (see FIGS. 2B, 3A, 3C) is inserted between previously mounted removable modules 40 (see FIGS. 2A, 2B), until each of the at least two substructure second end attachment openings 60 (see FIGS. 2C, 3A) slide over each of the at least two dagger pins 74a (see FIG. 3A). This may be referred to as a "dagger pin interface". Alternatively, the at least two dagger pins 74a (see FIG. 3A) may be coupled to or engaged with a fitting (not shown) located on the hollow box substructure 42 (see FIG. 3A).

As further shown in FIG. 3C, the plurality of second attachment elements 74 are configured to couple the second end 58 of the hollow box substructure 42 to the second end portion 30 of the at least one structural member 24, such as spar 24a. As further shown in FIG. 3C, each second attachment element 74 is inserted through a wing skin clearance opening 73 in the wing skin 67, is inserted through the second end attachment opening 34, such as in the form of extension portion attachment opening 34a, and is inserted through the substructure second end attachment opening 60.

Each wing skin clearance opening 73 (see FIG. 3C) is preferably aligned with each extension portion attachment opening 34a (see FIG. 3C), which are both preferably aligned with each substructure second end attachment opening 60 (see FIG. 3C). As designed, when the leading edge system 10 (see FIG. 3C), such as in the form of leading edge system 10a (see FIG. 3C), is assembled, each of the plurality of substructure second end attachment openings 60 (see FIG. 3C) is preferably aligned with each of the corresponding plurality of extension portion attachment openings 34a (see FIG. 3C) of the second end portion 30 (see FIG. 3C) of the structural member 24 (see FIG. 3C) and each wing skin clearance opening 73 (see FIG. 3C) of the wing skin 67.

Thus, the flange attachment openings 56 (see FIGS. 3A, 3B) on the opposite first end 52 (see FIGS. 3A, 3B) of the removable module 40 (see FIGS. 3A, 3B) device are engaged and aligned with the first end attachment openings 28 (see FIGS. 3A, 3B) via the first attachment elements 70 (see FIG. 3B), such as fasteners 70a (see FIG. 3B), and the first attachment elements 70 (see FIG. 3B), such as fasteners 70a (see FIG. 3B), are tightened down on nut plates 72 (see FIG. 3B). The engagement of the two dagger pins 74a (see FIGS. 3A, 3C), preferably fixed, and dagger pin nuts 74b (see FIGS. 3A, 3C), in the two substructure second end attachment openings 60 (see FIGS. 3A, 3C) in the extension portion 32 (see FIGS. 3A, 3C) of the structural member 24 (see FIGS. 3A, 3C), and the first attachment elements 70 (see FIG. 3B), such as fasteners 70a (see FIG. 3B), tightened down on the nut plates 72 (see FIG. 3B) on the first end 52 (see FIG. 3B) of the removable module 40 (see FIGS. 3A-3C) keep the removable module 40 (see FIGS. 3A-3C) in place.

FIG. 3C further shows the wing skin 67 adjacent the lower end of the structural member 24, such as in the form of spar 24a. The side 62 (see FIG. 3C), such as back side 62a (see FIG. 3C), of the hollow box substructure 42 (see FIG. 3C) is preferably adjacent to the structural member 24, such as in the form of spar 24a.

In another embodiment, as shown in FIGS. 4-6C, the leading edge system 10, such as in the form of leading edge system 10b, for an aerospace vehicle 12 (see FIG. 4), such as a spacecraft 12b (see FIG. 4), further comprises a thermal protection system (TPS) 77 (see FIGS. 5B, 6A-6C, 7B, 8) which includes at least a plurality of thermally insulative tiles 80, such as ceramic tiles 80a (see FIGS. 5A, 5B, 6A, 7B, 8), coupled to the exterior 44 (see FIG. 6A) of the hollow box substructure 42 (see FIGS. 5A, 5B, 6A, 7B, 8).

Figure 4:
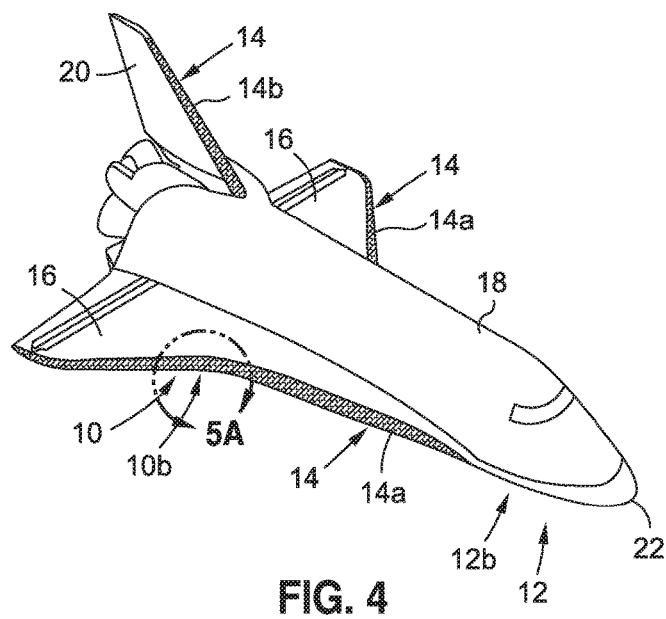
FIG. 4 is an illustration of a front perspective view of another exemplary aerospace vehicle having another exemplary embodiment of a leading edge system of the disclosure.

Now referring to FIG. 4, FIG. 4 is an illustration of a front perspective view of another exemplary aerospace vehicle 12, such as in the form of spacecraft 12b, having another exemplary embodiment of the leading edge system 10, such as in the form of leading edge system 10b, of the disclosure. As shown in FIG. 4, the leading edge system 10, such as in the form of leading edge system 10b, is removably attached along leading edges 14, such as leading edges 14a, of wings 16, which are coupled to the body 18. The leading edge system 10 (see FIG. 4), such as in the form of leading edge system 10b (see FIG. 4), may also be attached along the leading edge 14 (see FIG. 4), such as leading edge 14b (see FIG. 4), of tail 20 (see FIG. 4), or other airfoil surfaces on the aerospace vehicle 12 (see FIG. 4).

As discussed above, the aerospace vehicle 12 (see FIG. 4) having the leading edge system 10, such as in the form of leading edge system 10b, is configured to travel at an altitude of greater than 150,000 feet, for example, greater than 350,000 feet, and includes a plurality of thermally insulative tiles 80 (see FIGS. 5A-5B) for use in high temperature applications, such as in a temperature range of from about 500° F. (degrees Fahrenheit) to about 2500° F., and for use in high speed/high velocity (e.g., greater than Mach 5) orbital applications, and atmospheric re-entry applications. In this embodiment, the aerospace vehicle 12 (see FIG. 4) comprises a spacecraft 12b (see FIGS. 4, 8), a hypersonic vehicle 12f (see FIG. 8), a re-entry vehicle 12g (see FIG. 8), a reusable launch vehicle (RLV) 12h (see FIG. 8), or another suitable aerospace vehicle 12 (see FIGS. 4, 8) configured to travel at an altitude of greater than 150,000 feet, and configured for high speed/high velocity, and high temperature applications.

Figure 5C:
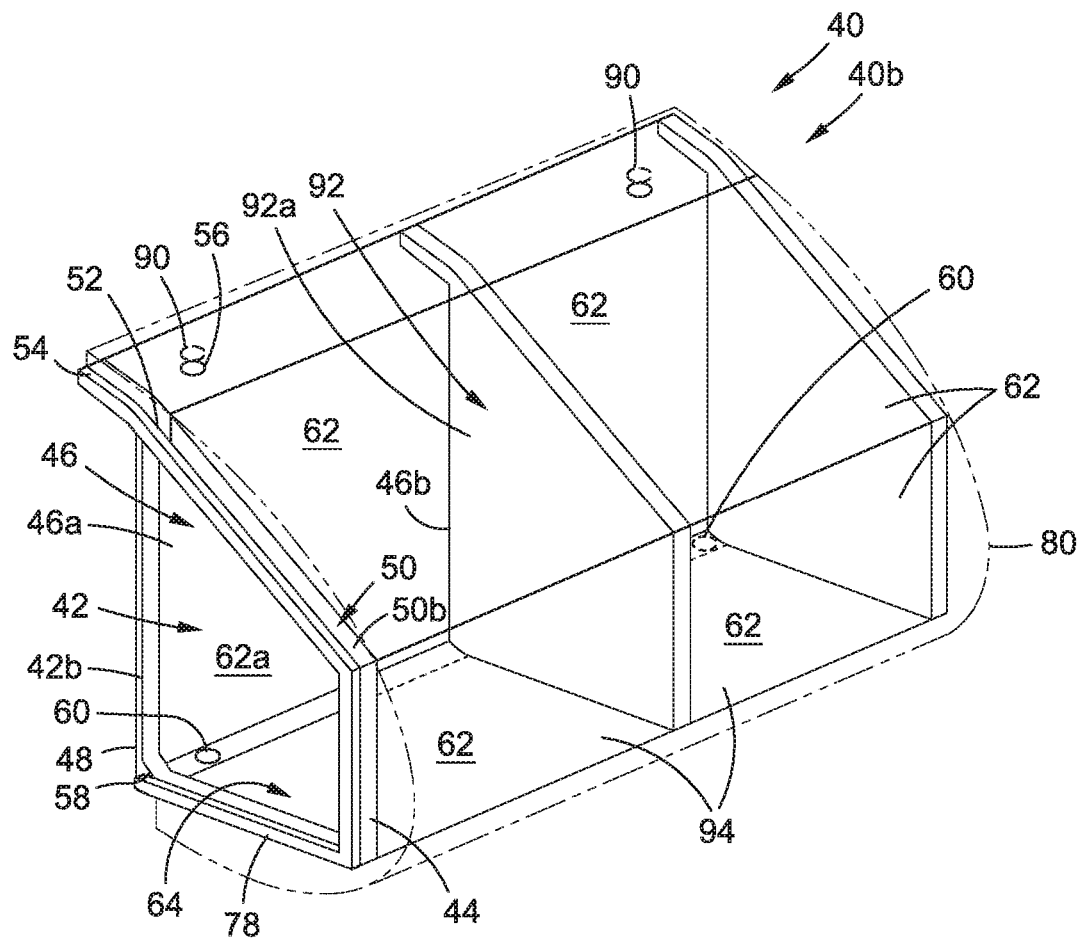
FIG. 5C is an illustration of a front perspective view of an exemplary hollow box substructure of the removed removable module of FIG. 5B showing a flow inhibiting barrier.
Figure 6A:
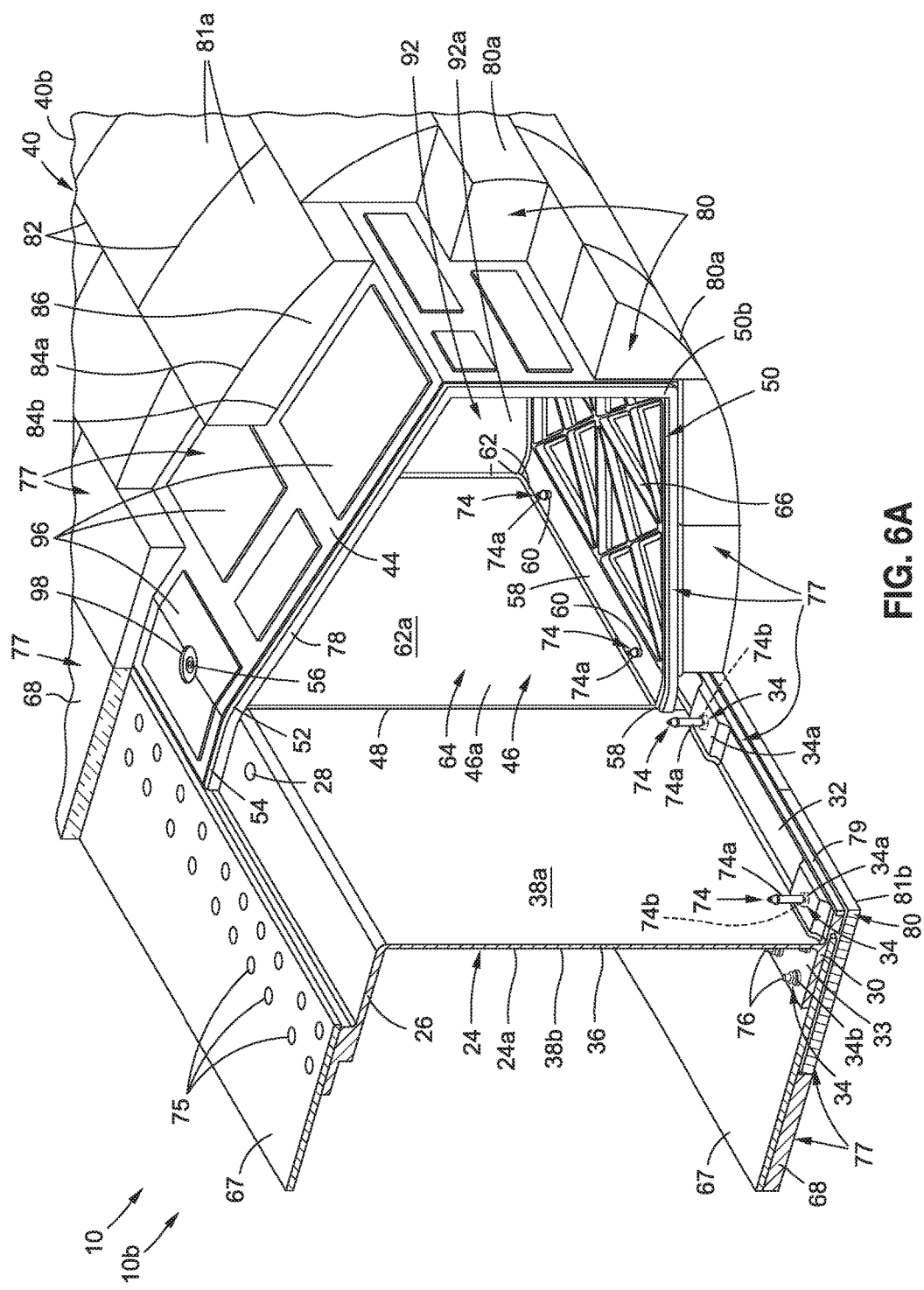
FIG. 6A is an illustration of a side perspective view of another exemplary embodiment of a leading edge system having a thermal protection system (TPS) and showing installation of the removable module independent of wing skins.

FIG. 5A is an illustration of a close-up, partial front perspective view of the leading edge 14 of FIG. 4 showing another exemplary embodiment of the leading edge system 10, such as in the form of leading edge system 10b, having a thermal protection system (TPS) 77 with the thermally insulative tiles 80. FIG. 5B is an illustration of the enlarged, partial front perspective view of the leading edge system 10, such as in the form of leading edge system 10b, of FIG. 5A with the removable module 40 shown removed. FIG. 5C is an illustration of a front perspective view of an exemplary hollow box substructure 42, such as in the form of hollow box substructure 42b, of the removed removable module of FIG. 5B showing a flow inhibiting barrier 92. FIG. 6A is an illustration of a side perspective view of another exemplary embodiment of the leading edge system 10, such as in the form of leading edge system 10b, having thermally insulative tiles 80 and showing installation of the removable module 40 independent of wing skins 67.

As shown in FIGS. 5A-5B and 6A, and as discussed above, the leading edge system 10, such as in the form of leading edge system 10a, comprises at least one structural member 24, such as in the form of a spar 24a, for example, a front spar. As discussed above, the structural member 24 (see FIGS. 5A-5B, 8) comprises one of, a spar 24a (see FIGS. 5A-5B, 8), a rib 24b (see FIG. 8), a stringer 24c (see FIG. 8), a beam 24d (see FIG. 8), or another suitable structural member 24 (see FIG. 8). Further, as discussed above and as shown in FIGS. 5A-5B and 6A, the structural member 24, such as in the form of a spar 24a, comprises a first end portion 26 with a plurality of first end attachment openings 28, a second end portion 30 having an extension portion 32 and an interior portion 33, and a body portion 36 with an exterior side 38a and an interior side 38b. The second end portion 30 (see FIGS. 5B, 6A) has a plurality of second end attachment openings 34 (see FIGS. 5B, 6A), and the second end attachment openings 34 (see FIGS. 5B, 6A) comprise extension portion attachment openings 34a (see FIGS. 52B, 6A) and interior portion attachment openings 34b (see FIGS. 5B, 6A).

As shown in FIGS. 5A-5B and 6A, the leading edge system 10, such as in the form of leading edge system 10b, further comprises one or more removable modules 40, such as in the form of removable modules 40b, removably attached to the at least one structural member 24. Each removable module 40 (see FIGS. 5A-5B), such as in the form of removable module 40b (see FIGS. 5A-6A), comprises a hollow box substructure 42 (see FIGS. 5A-6A), such as in the form of hollow box substructure 42b. The hollow box substructure 42 (see FIGS. 5A-6A) comprises an exterior 44 (see FIGS. 5A-6A) and an interior 46 (see FIGS. 5A-6A). Preferably, the interior 46 is a hollow interior 46a (see FIGS. 5A-6A).

The hollow box substructure 42 (see FIGS. 5A-6A) has a perimeter 48 (see FIGS. 5A-6A) having a D-box configuration 50 (see FIGS. 5A-6A). In the embodiment of the hollow box substructure 42 shown in FIGS. 5A-6A, the D-box configuration 50 comprises an angled configuration 50b.

As shown in FIG. 5C, the hollow box substructure 42, such as in the form of hollow box substructure 42b, of the removable module 40, such as in the form of removable module 40b, further comprises a flow inhibiting barrier 92 attached to an interior central portion 46b of the interior 46 of the hollow box substructure 42. The flow inhibiting barrier 92 (see FIG. 5C) is a closed span wise web that is designed to prevent or inhibit the flow of hot fluids such as gas, air, or plasma through the removable module 40 (see FIG. 5C). As further shown in FIG. 5C, the flow inhibiting barrier 92 is preferably in the form of a barrier wall 92a, and forms two separate volumes 94 substantially equivalent in size within the hollow box substructure 42. As shown in FIG. 5C, each separate volume 94 has a substructure second end attachment opening 60 at the second end 58 of the hollow box substructure 42. Alternatively, the flow inhibiting barrier 92 (see FIG. 5C) may be attached at near an open side portion 64 (see FIG. 5C) or end of the hollow box substructure 42 (see FIG. 5C), instead of at the interior central portion 46b (see FIG. 5C).

As shown in FIGS. 5B-6A, the hollow box substructure 42 of the removable module 40 comprises a first end 52, a second end 58, a plurality of sides 62 with preferably at least one open side portion 64, and at least one flange portion 54 disposed along the first end 52 of the hollow box substructure 42 and having a plurality of flange attachment openings 56. As designed, when the leading edge system 10 (see FIG. 6B), such as in the form of leading edge system 10b (see FIG. 6B), is assembled, each of the plurality of flange attachment openings 56 (see FIG. 6B) of the hollow box substructure 42 (see FIG. 6B) is aligned with each of the corresponding plurality of first end attachment openings 28 (see FIG. 6B) of the first end portion 26 (see FIG. 6B) of the structural member 24 (see FIG. 6B).

As shown in FIGS. 5C, 6A, and as discussed above, the second end 58 of the hollow box substructure 42 comprises a plurality of substructure second end attachment openings 60. As designed, when the leading edge system 10 (see FIG. 6C), such as in the form of leading edge system 10a (see FIG. 6C), is assembled, each of the plurality of substructure second end attachment openings 60 (see FIG. 6C) is aligned with each of the corresponding plurality of extension portion attachment openings 34a (see FIG. 6C) of the second end portion 30 (see FIG. 6C) of the structural member 24 (see FIG. 6C). The hollow box substructure 42 (see FIGS. 5A, 5B, 6A) may further optionally comprise one or more substructure stiffeners 66 disposed within the interior 46 (see FIGS. 5A, 5B, 6A).

As shown in FIGS. 5A, 5B, 6A, the leading edge system 10, such as in the form of leading edge system 10b, further comprises a plurality of thermally insulative tiles 80 coupled to the exterior 44 of the hollow box substructure 42 of the removable module 40, so as to thermally insulate and protect the hollow box substructure 42 and the removable module 40. The plurality of thermally insulative tiles 80 are preferably in the form of ceramic tiles 80a, silica ceramic, or another suitable material that can withstand high heat and high speeds. As shown in FIGS. 5A, 6A, each thermally insulative tile 80 has an exterior side 84a, an interior side 84b, and a body 86 therebetween.

As shown in FIGS. 5A, 6A, the thermally insulative tiles 80 are preferably attached in an adjacent arrangement 82 over the exterior 44 of the hollow box substructure 42. Each thermally insulative tile 80 (see FIGS. 5A, 6A) is preferably in the adjacent arrangement 82 (see FIGS. 5A, 6A) with at least one other thermally insulative tile 80 (see FIGS. 5A, 6A), such that hypersonic gas flow or heated air or plasma between adjacent thermally insulative tiles 80 (see FIGS. 5A, 6A) is substantially impeded.

The thermally insulative tiles 80 (see FIG. 6B) coupled over the first attachment elements 70 (see FIG. 6B) preferably each have a tile opening 88 (see FIG. 6B), which is filled with an insert element 90 (see FIGS. 5A-5C, 6B). As part of the thermal protection system (TPS) 77 (see FIGS. 5A, 5B, 6B), the insert element 90 (see FIGS. 5A, 5B, 6B) is configured to cover and protect each of the plurality of first attachment elements 70 (see FIG. 6B), such as in the form of fastener 70a (see FIG. 6B). The insert element 90 (see FIGS. 5A-5C, 6B) may be screw-in ceramic, or cement in/drill out, and may be made of ceramic, fused silica, silica ceramic, cement, or another suitable material designed for high heat and high speed applications.

In addition to the plurality of thermally insulative tiles 80 (see FIGS. 5A, 5B, 6A, 6B) and insert elements 90 (see FIGS. 5A, 5B, 6A, 6B), the thermal protection system (TPS) 77 (see FIGS. 5A, 5B, 6A, 6B, 7B, 8) may further include or comprise insulation material 68 (see FIGS. 5A, 5B, 6A, 6B, 7B, 8) adjacent to and/or attached to one or more of the wing skins 67 (upper and lower) (see FIGS. 6A, 6B, 7B), or other structural components of the aerospace vehicle 12 (see FIG. 4). The insulation material 68 (see FIGS. 5A, 5B, 6A, 6B, 7B, 8) preferably comprises conformal reusable insulation (CRI), such as in the form of a quilted blanket comprised of a ceramic fiber matrix composite material sandwiched between fabric face sheets. However, the insulation material 68 (see FIGS. 5A, 5B, 6A, 6B, 7B, 8) may also comprise felt reusable surface insulation (FRSI), advanced flexible reusable surface insulation (AFRSI), or another suitable insulation material.

Figure 6B:
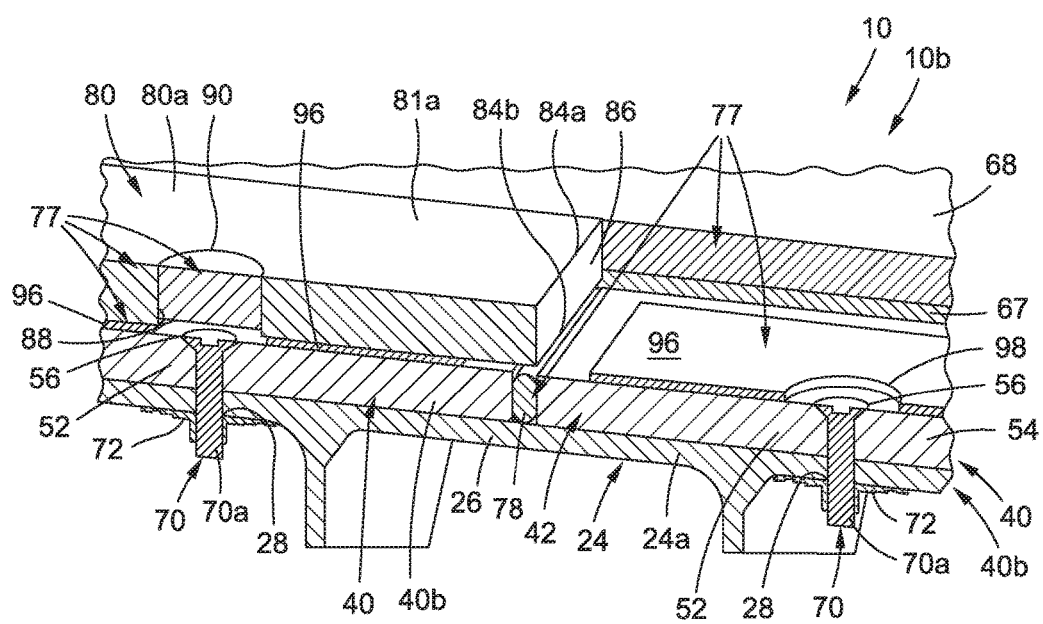
FIG. 6B is an illustration of an enlarged cross-sectional front view of an exemplary embodiment of a leading edge system of the disclosure having a thermal protection system (TPS) 77 and showing first attachment elements fastening a removable module to a first end portion of a structural member.
Figure 6C:
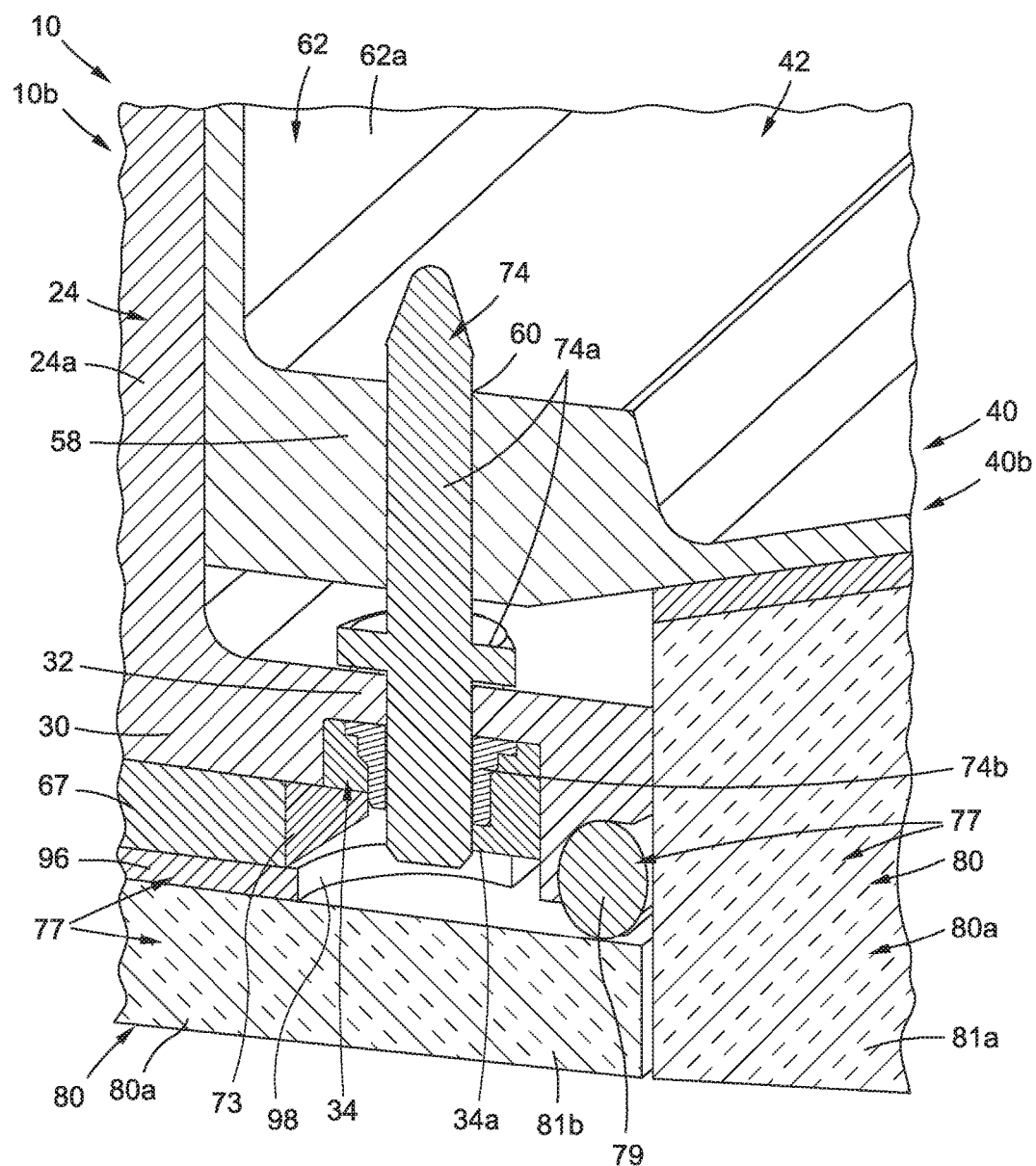
FIG. 6C is an illustration of an enlarged cross-sectional side view of an exemplary embodiment of a leading edge system of the disclosure having a thermal protection system (TPS) and showing a second attachment element fastening a removable module to a second end portion of a structural member.
Figure 7A:
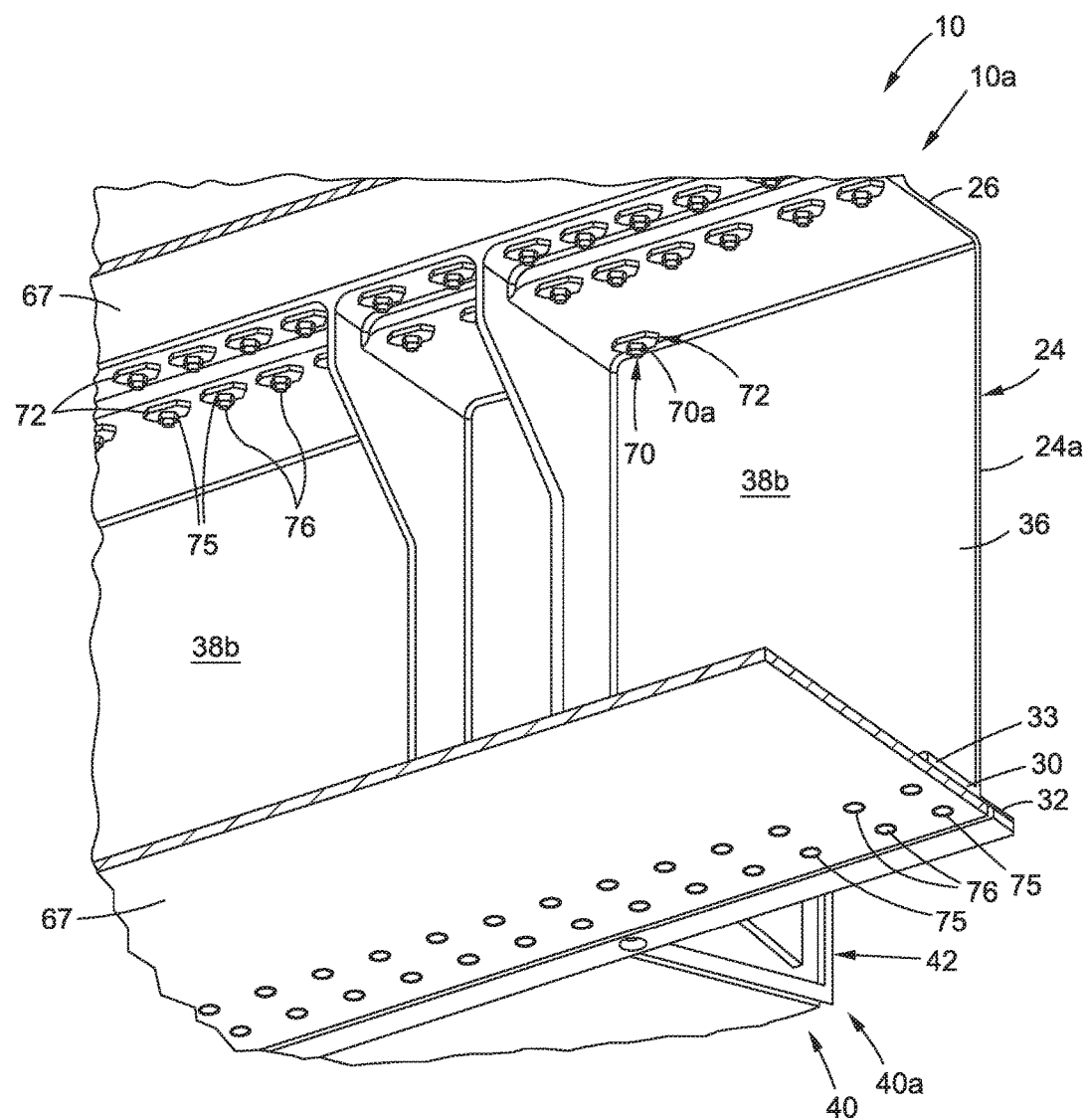
FIG. 7A is an illustration of a back perspective view of an exemplary embodiment of a leading edge system of the disclosure not having a thermal protection system (TPS)
Figure 7B:
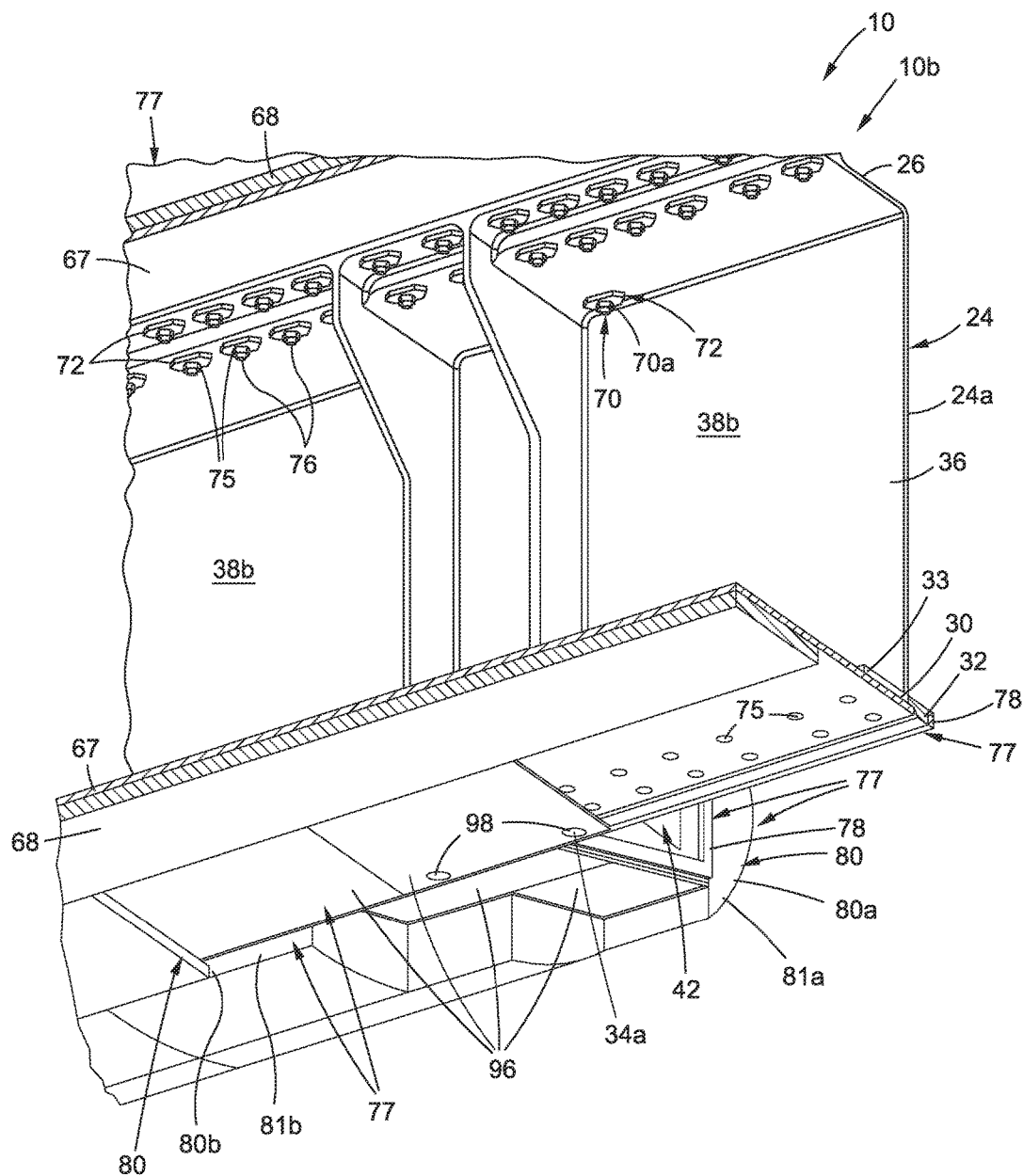
FIG. 7B is an illustration of a back perspective view of an exemplary embodiment of a leading edge system of the disclosure having a thermal protection system (TPS)

The thermal protection system (TPS) 77 (see FIGS. 5A, 5B, 6A, 6B, 7B, 8) may further include or comprise the first thermal barrier element 78 (see FIGS. 5B, 5C, 6A, 6B, 7B, 8) coupled between adjacent hollow box substructures 42 (see FIGS. 5B, 6B), and the second thermal barrier element 79 (see FIGS. 5B, 6A, 6C, 7B, 8) coupled to the structural member 24 (see FIGS. 6C, 7). The first thermal barrier element 78 (see FIGS. 5B, 6A, 6B, 7, 8) and the second thermal barrier element 79 (see FIGS. 6C, 7) may each be made of a material comprising one or more of, ceramic, fused silica, silica ceramic, alumina, or another suitable material.

The thermal protection system (TPS) 77 (see FIGS. 5A, 5B, 6A, 6B, 7B, 8) may further include or comprise one or more strain isolation pads 96 (see FIGS. 6A-6C, 7B, 8) coupled between the exterior 44 (see FIG. 6A) of the hollow box substructure 42 (see FIGS. 6A, 7B) and the interior sides 84b (see FIGS. 6A, 6B) of the plurality of thermally insulative tiles 80 (see FIGS. 6A, 6B). Each strain isolation pad 96 (see FIGS. 6A, 6B) has a strain isolation pad opening 98 (see FIGS. 6A, 6B) that is open around and surrounds the top of the first attachment element 70 (see FIG. 6B), and that is configured to be substantially the same size and shape as the diameter of the insert element 90 (see FIG. 6B) to be inserted within the tile opening 88a (see FIG. 6B) and which may be partially inserted within the strain isolation pad opening 98 (see FIG. 6B).

The one or more strain isolation pads 96 (see FIGS. 6A-6C, 7B, 8) are preferably made of a flexible coated needled-felt meta-aramid material, or another suitable material. The one or more strain isolation pads 96 (see FIGS. 6A-6C, 7B, 8) are preferably adhered to the plurality of thermally insulative tiles 80 (see FIGS. 6A, 6B) and then adhered to the hollow box substructure 42 (see FIGS. 6A, 6B) using silicone or another suitable adhesive, designed for high temperature, high speed, and high stress applications. Preferably, the one or more strain isolation pads 96 (see FIGS. 6A-6C, 7B, 8) are constructed of a material that has excellent thermal characteristics and prevents tearing or damage during lateral displacements.

The thermal protection system (TPS) 77 (see FIG. 8) may further include or comprise a pressure seal 99 (see FIG. 8) that may be coupled to either or both of the first thermal barrier element 78 (see FIGS. 5B, 6A, 6B, 7B, 8) and the second thermal barrier element 79 (see FIGS. 5B, 6A, 6C, 7B, 8). The pressure seal 99 (see FIG. 8) is designed to seal off or inhibit hypersonic gas flow, heated air, and/or plasma from moving through the removable module 40 (see FIGS. 5B, 6A, 8), such as removable module 40b (see FIGS. 5B, 6A, 8). The pressure seal 99 (see FIG. 8) may be comprised of one or more materials, including but not limited to, silicone, rubber, silicone rubber, other elastomers, or other suitable materials.

With this embodiment shown in FIGS. 4-6C of the leading edge system 10, such as in the form of leading edge system 10b, having the thermal protection system (TPS) 77 (see FIG. 8) with at least the thermally insulative tiles 80 (see FIGS. 6A, 8), the individually replaceable modules 40 (see FIGS. 6A, 8) for the leading edge 14 (see FIG. 4) of the aerospace vehicle 12 (see FIG. 4), enable the thermal protection system (TPS) 77 (see FIG. 8) to be serviced with minimal impact to grounding of the aerospace vehicles 12, while repair or maintenance is performed.

Now referring to FIG. 6B, the leading edge system 10, such as in the form of leading edge system 10b, further comprises a plurality of first attachment elements 70 configured for attaching the at least one flange portion 54 of the removable module 40, such as in the form of removable module 40b, to a first end portion 26 of the at least one structural member 24. FIG. 6B is an illustration of an enlarged cross-sectional front view of an exemplary embodiment of the leading edge system 10, such as in the form of leading edge system 10b, of the disclosure showing the plurality of first attachment elements 70 fastening the removable module 40 to the first end portion 26 of the structural member 24.

As shown in FIG. 6B, the plurality of first attachment elements 70 each comprise a fastener 70a secured in place with nut plate 72. The first attachment element 70 (see FIGS. 6B, 8) each comprises a fastener 70a (see FIGS. 6B, 8), a bolt 70b (see FIG. 8), or another suitable attachment element 70 (see FIG. 8). As further shown in FIG. 6B, the plurality of first attachment elements 70 fasten the first end 52 of each hollow box substructure 42 to the first end portion 26 of the at least one structural member 24, such as in the form of spar 24a. Each of the plurality of first attachment elements 70 (see FIG. 6B) is inserted through each of the plurality of flange attachment openings 56 (see FIG. 6B) and through each of the plurality of first end attachment openings 28 (see FIG. 6B). Each flange attachment opening 56 (see FIG. 6B) is preferably aligned with each first end attachment opening 28 (see FIG. 6B).

FIG. 6B further shows a thermally insulative tile 80, such as a ceramic tile 80a, attached to the flange portion 54 of the hollow box substructure 42. As shown in FIG. 6B, the thermally insulative tile 80 is in the form of a module mounted tile 81a having an exterior side 84a, an interior side 84b, and a body 86 therebetween. As further shown in FIG. 6B, the thermally insulative tile 80 has a tile opening 88 which is filled with an insert element 90 that covers the top of the first attachment element 70, such as in the form of fastener 70a. As further shown in FIG. 6B, one or more strain isolation pads 96 may be coupled or attached between the top of the flange portion 54 of the hollow box substructure 42 and the interior side 84b of the thermally insulative tile 80. The strain isolation pad 96 (see FIG. 6B) has a strain isolation pad opening 98 (see FIG. 6B) that is open around the top of the first attachment element 70 (see FIG. 6B), and that is configured to be substantially the same size and shape as the insert element 90 (see FIG. 6B) to be inserted within the tile opening 88a (see FIG. 6B) and to be partially inserted within the strain isolation pad opening 98 (see FIG. 6B).

As further shown in FIG. 6B, the wing skin 67 and the insulation material 68 are adjacent the thermally insulative tile 80. As further shown in FIG. 6B, the first thermal barrier element 78 is coupled between adjacent removable modules 40, such as in the form of removable modules 40*b*.

Now referring to FIG. 6C, the leading edge system 10, such as in the form of leading edge system 10*b*, further comprises a plurality of second attachment elements 74 (see also FIGS. 5B, 6A) configured for attaching the second end 58 of the hollow box substructure 42 opposite the at least one flange portion 54 (see FIG. 6A), to the second end portion 30 of the at least one structural member 24 opposite the first end portion 26 (see FIG. 6A). FIG. 6C is an illustration of an enlarged cross-sectional side view of an exemplary embodiment of the leading edge system 10, such as in the form of leading edge system 10*b*, of the disclosure showing the second attachment element 74 fastening a removable module 40, such as in the form of removable module 40*b*, to the second end portion 30 of the structural member 24.

As shown in FIG. 6C, the second attachment element 74 comprises a dagger pin 74*a* and a dagger pin nut 74*b*, or other suitable attachment elements 74. As further shown in FIG. 6C, the plurality of second attachment elements 74 are configured to couple the second end 58 of the hollow box substructure 42 to the second end portion 30 of the at least one structural member 24, such as spar 24*a*. As further shown in FIG. 6C, each second attachment element 74 is inserted through a wing skin clearance opening 73 in the wing skin 67, is inserted through the second end attachment opening 34, such as in the form of extension portion attachment opening 34*a*, and is inserted through the substructure second end attachment opening 60.

Each wing skin clearance opening 73 (see FIG. 6C) is preferably aligned with each extension portion attachment opening 34*a* (see FIG. 6C), which are both preferably aligned with each substructure second end attachment opening 60 (see FIG. 6C). As designed, when the leading edge system 10 (see FIG. 6C), such as in the form of leading edge system 10*b* (see FIG. 6C), is assembled, each of the plurality of substructure second end attachment openings 60 (see FIG. 6C) is preferably aligned with each of the corresponding plurality of extension portion attachment openings 34*a* (see FIG. 6C) of the second end portion 30 (see FIG. 6C) of the structural member 24 (see FIG. 6C) and each wing skin clearance opening 73 (see FIG. 6C) of the wing skin 67 (see FIG. 6C).

FIG. 6C further shows thermally insulative tiles 80, such as ceramic tiles 80*a*, in the form of a module mounted tile 81*a* mounted to the removable module 40, and a wing mounted tile 81*b* mounted to the wing skin 67 with the strain isolation pad 96 in between. As further shown in FIG. 6C, the strain isolation pad 96 has a strain isolation pad opening 98 that is open around and surrounds the bottom of the second attachment element 74. As further shown in FIG. 6C, the side 62, such as the back side 62*a*, of the hollow box substructure 42 is adjacent the structural member 24. As further shown in FIG. 6C, the second thermal barrier element 79 is adjacent to and in between the lower end of the extension portion 32 of the structural member 24 and the module mounted tile 81*a* and the wing mounted tile 81*b*.

Figure 8:
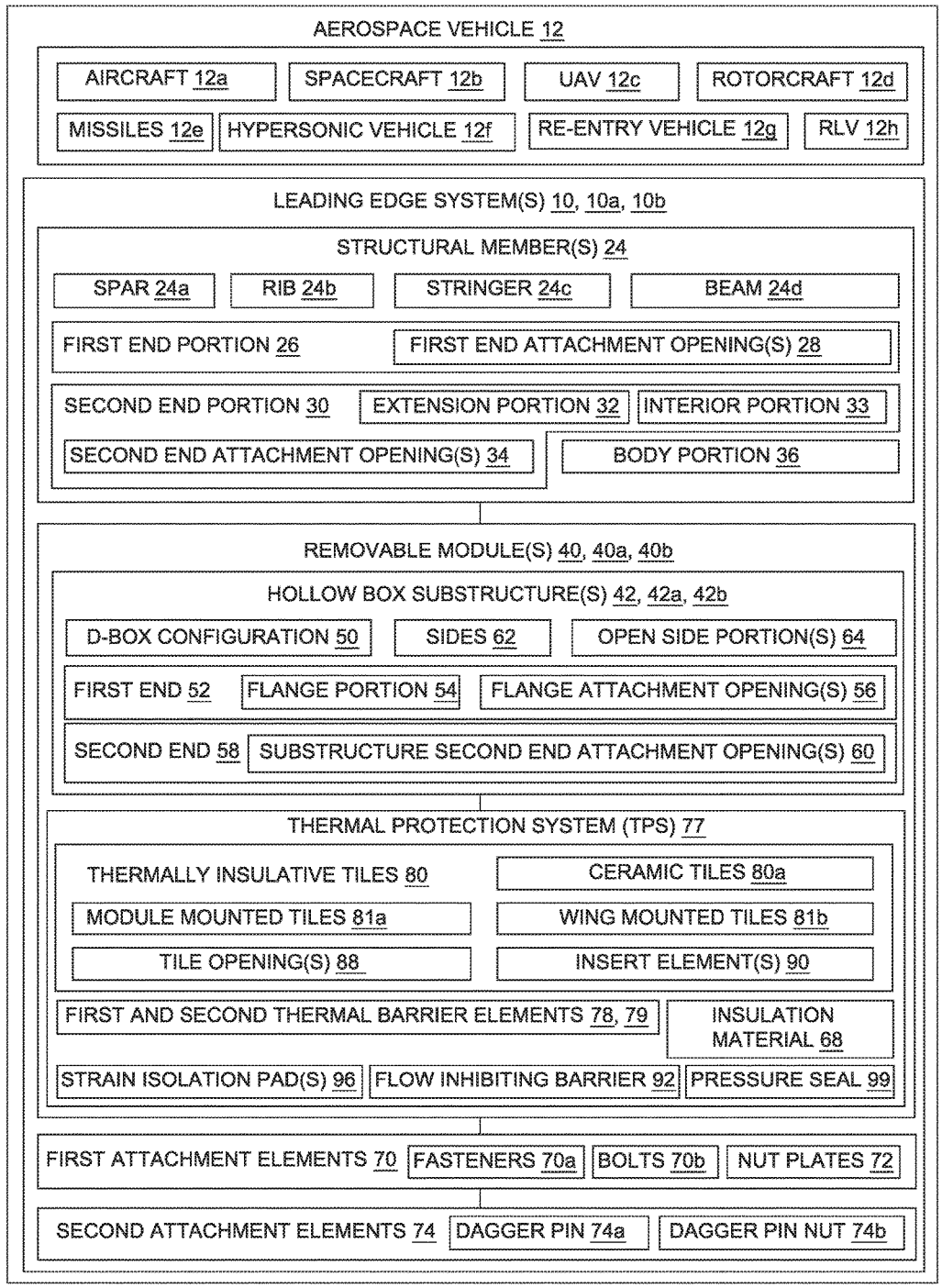
FIG. 8 is an illustration of a functional block diagram showing exemplary embodiments of leading edge systems of the disclosure.

Now referring to FIG. 7A, FIG. 7A is an illustration of a back perspective view of an exemplary embodiment of the leading edge system 10, such as in the form of leading edge system 10*a*, of the disclosure, that does not have the thermal protection system (TPS) 77 (see FIGS. 6A, 7B, 8). FIG. 7A shows the interior side 38*b* of the body portion 36 of the structural member 24, such as in the form of spar 24*a*. As shown in FIG. 7A, the first end portion 26 and the interior portion 33 of the second end portion 30 of the structural member 24 are preferably each attached to separate wing skins 67 (upper and lower) via the plurality of wing skin fasteners 76 that may preferably be inserted through wing skin fastener openings 75 and held in place with nut plates 72. FIG. 7A further shows the hollow box substructure 42 of the removable module 40 (see FIG. 3A), such as in the form of module 40*a*, and the extension portion 32 of the second end portion 30 of the structural member 24.

Now referring to FIG. 7B, FIG. 7B is an illustration of a back perspective view of an exemplary embodiment of the leading edge system 10, such as in the form of leading edge system 10*b*, of the disclosure, that has the thermal protection system (TPS) 77. FIG. 7B shows the interior side 38*b* of the body portion 36 of the structural member 24, such as in the form of spar 24*a*. As shown in FIG. 7B, the first end portion 26 and the interior portion 33 of the second end portion 30 of the structural member 24 are preferably each attached to separate wing skins 67 (upper and lower) via the plurality of wing skin fasteners 76 that may be inserted through wing skin fastener openings 75 and held in place with nut plates 72.

As further shown in FIG. 7B, the thermal protection system (TPS) 77 of the leading edge system 10, such as in the form of leading edge system 10*b*, comprises the insulation material 68 attached adjacent to each of the separate wing skins 67 (upper and lower), the first thermal barrier element 78 coupled adjacent to the hollow box substructure 42, the second thermal barrier element 79 coupled adjacent to the extension portion 32 of the second end portion 30 of the structural member 24, the thermally insulative tiles 80, and the strain isolation pads 96.

FIG. 7B shows a cut-away portion of the thermally insulative tiles 80, such as ceramic tiles 80*a*, in the form of module mounted tiles 81*a*, and ceramic tiles 80*b*, in the form of wing mounted tiles 81*b*, and further shows the strain isolation pads 96 mounted to the wing skin 67 (lower), adjacent the insulation material 68, and adjacent the hollow box substructure 42. The module mounted tiles 81*a* (see FIGS. 6A, 7B) and the wing mounted tiles 81*b* (see FIG. 7B) are preferably mounted over the strain isolation pads 96.

FIG. 8 is an illustration of a functional block diagram showing exemplary embodiments of the leading edge systems 10, 10*a*, 10*b* of the disclosure. As shown in FIG. 8, and discussed in detail above, the leading edge systems 10, 10*a*, 10*b*, are for use in aerospace vehicles 12, for example, one or more of an aircraft 12*a*, a spacecraft 12*b*, an unmanned air vehicle (UAV) 12*c*, a rotorcraft 12*d*, a missile 12*e*, a hypersonic vehicle 12*f*, a re-entry vehicle 12*g*, a reusable launch vehicle (RLV) 12*h*, or another suitable aerospace vehicle 12.

As further shown in FIG. 8, the leading edge systems 10, 10*a*, 10*b* each comprise at least one structural member 24. The structural member 24 (see FIG. 8) comprises one of, a spar 24*a* (see FIG. 8) such as a front spar, a rib 24*b* (see FIG. 8), a stringer 24*c* (see FIG. 8), a beam 24*d* (see FIG. 8), or another suitable structural member 24 (see FIG. 8). Each structural member 24 (see FIG. 8) has a first end portion 26 (see FIG. 8) with a plurality of first end attachment openings 28 (see FIG. 8), and a second end portion 30 (see FIG. 8) having an extension portion 32 (see FIG. 8) and an interior portion 33 (see FIG. 8), and a body portion 36 (see FIG. 8). The second end portion 30 (see FIG. 8) has a plurality of second end attachment openings 34 (see FIG. 8)

As further shown in FIG. 8, the leading edge systems 10, 10*a*, 10*b* each comprise a plurality of removable modules 40, such as removable modules 40*a* (see FIG. 3A) or removable modules 40*b* (see FIG. 5A), coupled to the structural member 24. Each removable module 40 (see FIGS. 2C, 5C, 8) comprises a hollow box substructure 42 (see FIGS. 2C, 5C, 8), such as in the form of hollow box substructure 42a (see FIGS. 2C, 8) or hollow box substructure 42b (see FIGS. 5C, 8), having a D-box configuration 50 (see FIGS. 2C, 5C, 8), a plurality of sides 62 (see FIGS. 2C, 5C, 8), and optionally, one or more open side portions 64 (see FIGS. 2C, 5C, 8). As further shown in FIG. 8, the hollow box substructure 42 comprises a first end 52 (see also, FIGS. 2C, 5C) with a flange portion 54 (see also, FIGS. 2C, 5C) having a plurality of flange attachment openings 56 (see also, FIGS. 2C, 5C), and a second end 58 (see also, FIGS. 2C, 5C) with a plurality of substructure end attachment openings 60 (see also, FIGS. 2C, 5C).

As further shown in FIG. 8, and as discussed above in detail, in the embodiment of the leading edge system 10, such as in the form of leading edge system 10b, as shown in FIGS. 4-6C and 7B, the leading edge system 10, such as in the form of leading edge system 10b, further comprises the thermal protection system (TPS) 77 comprising at least the plurality of thermally insulative tiles 80, such as ceramic tiles 80a, in the form of module mounted tiles 81a and wing mounted tiles 81b, having tile openings 88 each configured to receive an insert element 90.

As further shown in FIG. 8, the thermal protection system (TPS) 77 may additionally comprise the first thermal barrier element 78, the second thermal barrier element 79, one or more strain isolation pads 96, a flow inhibiting barrier 92, a pressure seal 99, and insulation material 68, such as conformal reusable insulation (CRI), felt reusable surface insulation (FRSI), advanced flexible reusable surface insulation (AFRSI), or another suitable insulation material.

As further shown in FIG. 8, the leading edge systems 10, 10a, 10b each comprise a plurality of first attachment elements 70 such as in the form of fasteners 70a, bolts 70b, or another suitable fastener element, each secured in place with a nut plate 72. As further shown in FIG. 8, the leading edge systems 10, 10a, 10b each comprise a plurality of second attachment elements 74, such as in the form of a dagger pin 74a and a dagger pin nut 74b.

Figure 9:
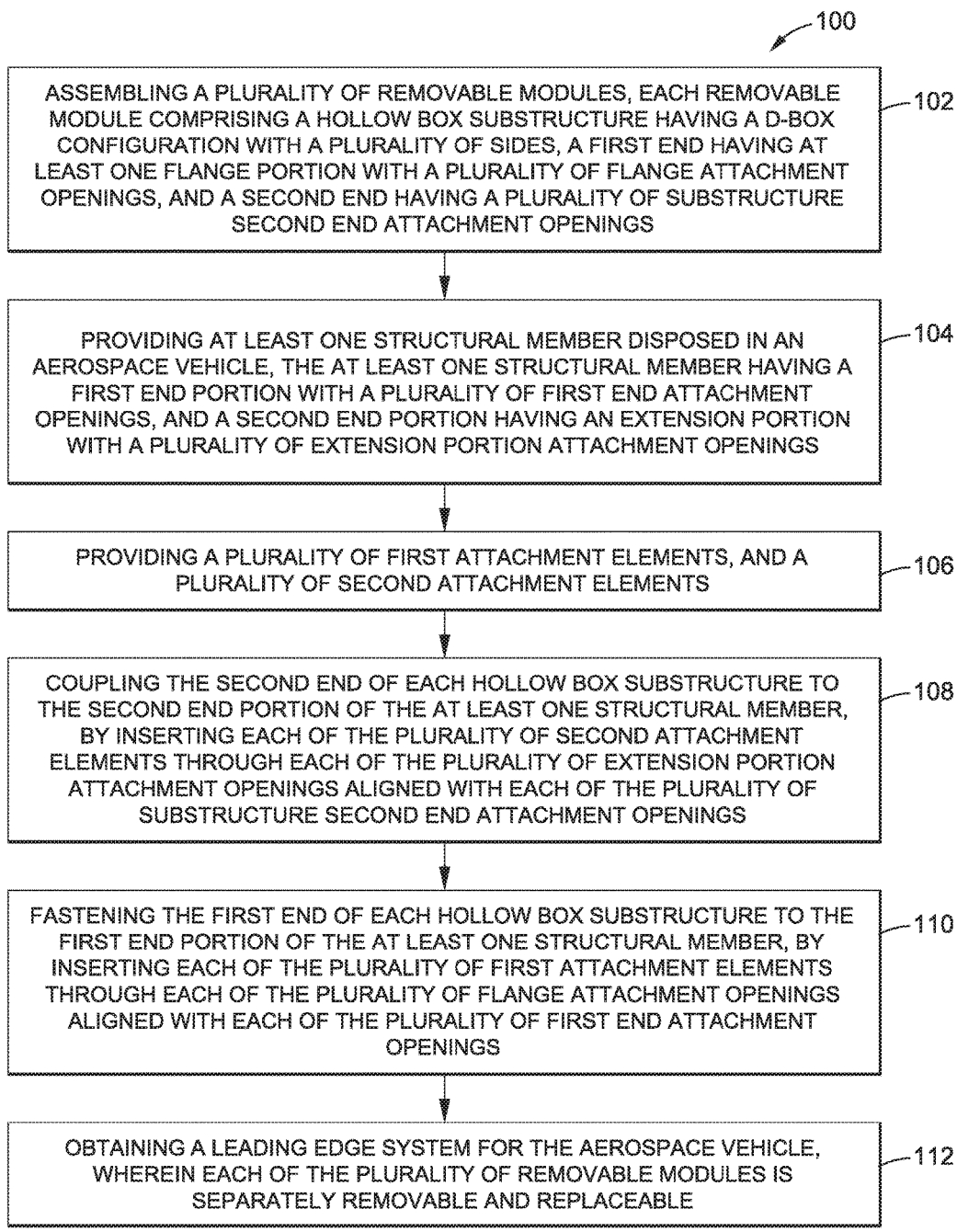
FIG. 9 is an illustration of an exemplary flowchart showing a method of assembling a leading edge system for an aerospace vehicle according to an embodiment of the disclosure.

Referring now to FIG. 9, in another embodiment there is provided a method 100 of assembling a leading edge system 10 (see FIGS. 1-6C) for an aerospace vehicle 12 (see FIGS. 1, 4). FIG. 9 is an illustration of an exemplary flowchart showing the method 100 of assembling the leading edge system 10 (see FIGS. 1-6C) for the aerospace vehicle 12 (see FIGS. 1, 4) according to an embodiment of the disclosure.

In one embodiment, the aerospace vehicle 12 (see FIG. 1), such as in the form of an aircraft 12a (see FIG. 1), an unmanned air vehicle (UAV) 12c (see FIG. 8), a rotorcraft 12d (see FIG. 8), a missile 12e (see FIG. 8), or another suitable aerospace vehicle 12 (see FIG. 1), is configured to travel at an altitude of 350,000 feet or less, and preferably, at an altitude of 150,000 feet or less, and does not include the thermal protection system (TPS) 77 (see FIGS. 6A-6C, 7B, 8).

In another embodiment, the aerospace vehicle 12 (see FIGS. 4, 8), such as in the form of a spacecraft 12b (see FIGS. 4, 8), a hypersonic vehicle 12f (see FIG. 8), a re-entry vehicle 12g (see FIG. 8), a reusable launch vehicle (RLV) 12h (see FIG. 8), or another suitable aerospace vehicle 12 (see FIGS. 4, 8), is configured to travel at an altitude of greater than 150,000 feet, and is configured to travel at high speeds (e.g., greater than Mach 5).

As shown in FIG. 9, the method 100 comprises step 102 of assembling a plurality of removable modules 40 (see FIGS. 1-6C). Each removable module 40 (see FIGS. 2C, 5C) comprises a hollow box substructure 42 (see FIGS. 2C, 5C) having a D-box configuration 50 (see FIGS. 2C, 5C) with a plurality of sides 62 (see FIGS. 2C, 5C), a first end 52 (see FIGS. 2C, 5C) having at least one flange portion 54 (see FIGS. 2C, 5C) with a plurality of flange attachment openings 56 (see FIGS. 2C, 5C), and a second end 58 (see FIGS. 2C, 5C) having a plurality of substructure second end attachment openings 60 (see FIGS. 2C, 5C).

In another embodiment, the step 102 of assembling the plurality of removable modules 40 (see FIGS. 5A-6A) further comprises coupling a plurality of thermally insulative tiles 80 (see FIGS. 5A, 6A) to an exterior 44 (see FIG. 6A) of the hollow box substructure 42 (see FIG. 6A). The plurality of thermally insulative tiles 80 (see FIG. 6B) comprises one or more tile openings 88 (see FIG. 6B). Each of the one or more tile openings 88 (see FIG. 6B) is preferably filled with an insert element 90 (see FIG. 6B) configured to cover and protect each of the plurality of first attachment elements 70 (see FIG. 6B), such as fasteners 70a (see FIG. 6B).

The step 102 of assembling the plurality of removable modules 40 (see FIGS. 5A-6A) further comprises attaching a flow inhibiting barrier 92 (see FIG. 5C) to an interior central portion 46b (see FIG. 5C) of the hollow box substructure 42 (see FIG. 5C), and forming at least two separate volumes 94 (see FIG. 5C) within the hollow box substructure 42 (see FIG. 5C). The flow inhibiting barrier 92 (see FIG. 5C) preferably comprises a barrier wall 92a (see FIG. 5C), configured to inhibit the flow of hypersonic gas, air, plasma, or other fluids or gases. Alternatively, the flow inhibiting barrier 92 (see FIG. 5C) may be attached at or near an open side portion 64 (see FIG. 5C) of the hollow box substructure 42 (see FIG. 5C).

The step 102 of assembling the plurality of removable modules 40 (see FIGS. 5A-6A) further comprises assembling the plurality of removable modules 40 (see FIGS. 5A-6A) comprising the thermal protection system (TPS) 77 (see FIGS. 5A-6C), wherein the TPS 77 (see FIGS. 5A-6C) further comprises insulation material 68 (see FIGS. 6A-6B) adjacent one or more wing skins 67 (see FIGS. 6A-6B) of the aerospace vehicle 12 (see FIG. 4), a first thermal barrier element 78 (see FIG. 5B) coupled between adjacent hollow box substructures 42 (see FIG. 5B), a second thermal barrier element 79 (see FIGS. 6A, 6C) coupled to the structural member 24 (see FIGS. 6A, 6C), and one or more strain isolation pads 96 (see FIGS. 6A, 6B) coupled between the exterior 44 (see FIG. 6A) of the hollow box substructure 42 (see FIGS. 6A, 6B) and the plurality of thermally insulative tiles 80 (see FIGS. 6A, 6B). Optionally, a pressure seal 99 (see FIG. 8) may be coupled adjacent to either or both of the first thermal barrier element 78 (see FIGS. 5B, 8) between adjacent hollow box substructures 42 (see FIG. 5B), and the second thermal barrier element 79 (see FIGS. 6C, 8). The pressure seal 99 (see FIG. 8) may be comprised of one or more materials, including but not limited to, silicone, rubber, silicone rubber, other elastomers, or other suitable materials. The first thermal barrier element 78 (see FIG. 5B) and the second thermal barrier element 79 (see FIG. 5B) may be comprised of one or more materials, including but not limited to, ceramic, fused silica, silica ceramic, alumina, or other suitable materials.

As further shown in FIG. 9, the method 100 comprises step 104 of providing at least one structural member 24 (see FIGS. 3A, 6A) disposed in the aerospace vehicle 12 (see FIGS. 1, 4). As shown in FIGS. 3A, 6A, the at least one structural member 24 has a first end portion 26 with a plurality of first end attachment openings 28, and a second end portion 30 having an extension portion 32 with a plurality of extension portion attachment openings 34a.

As further shown in FIG. 9, the method 100 comprises step 106 of providing a plurality of first attachment elements 70 (see FIGS. 3B, 6B), and a plurality of second attachment elements 74 (see FIGS. 3C, 6C). The step 106 of providing the plurality of first attachment elements 70 (see FIGS. 3B, 6B) comprises providing the plurality of first attachment elements 70 (see FIGS. 3B, 6B). Each first attachment element 70 (see FIGS. 3B, 6B, 8) preferably comprises a fastener 70a (see FIGS. 3B, 6B, 8), a bolt 70b (see FIG. 8), or another suitable attachment element 70, used with one or more nut plates 72 (see FIGS. 3B, 6B, 8). The step 106 of providing the plurality of second attachment elements 74 (see FIGS. 3C, 6C) comprises providing the plurality of second attachment elements 74 (see FIGS. 3C, 6C) each comprising a dagger pin 74a (see FIGS. 3C, 6C) and a dagger pin nut 74b (see FIGS. 3C, 6C), or other suitable attachment elements 74.

As further shown in FIG. 9, the method 100 comprises step 108 of coupling the second end 58 (see FIGS. 3C, 6C) of each hollow box substructure 42 (see FIGS. 3C, 6C) to the second end portion 30 (see FIGS. 3C, 6C) of the at least one structural member 24 (see FIGS. 3C, 6C), by inserting each of the plurality of second attachment elements 74 (see FIGS. 3A, 3C, 6A, 6C) through each of the plurality of extension portion attachment openings 34a (see FIGS. 3A, 3C, 6A, 6C) aligned with each of the plurality of substructure second end attachment openings 60 (see FIGS. 3A, 3C, 6A, 6C).

As further shown in FIG. 9, the method 100 comprises step 110 of fastening the first end 52 (see FIGS. 3B, 6B) of each hollow box substructure 42 (see FIGS. 3B, 6B) to the first end portion 26 (see FIGS. 3B, 6B) of the at least one structural member 24 (see FIGS. 3B, 6B), by inserting each of the plurality of first attachment elements 70 (see FIGS. 3B, 6B) through each of the plurality of flange attachment openings 56 (see FIGS. 3B, 6B) aligned with each of the plurality of first end attachment openings 28 (see FIGS. 3B, 6B).

As further shown in FIG. 9, the method 100 comprises step 112 of obtaining the leading edge system 10 (see FIGS. 1-6C) for the aerospace vehicle 12 (see FIGS. 1, 4), wherein each of the plurality of removable modules 40 (see FIGS. 2B, 5B) is separately removable and replaceable.

Figure 10:
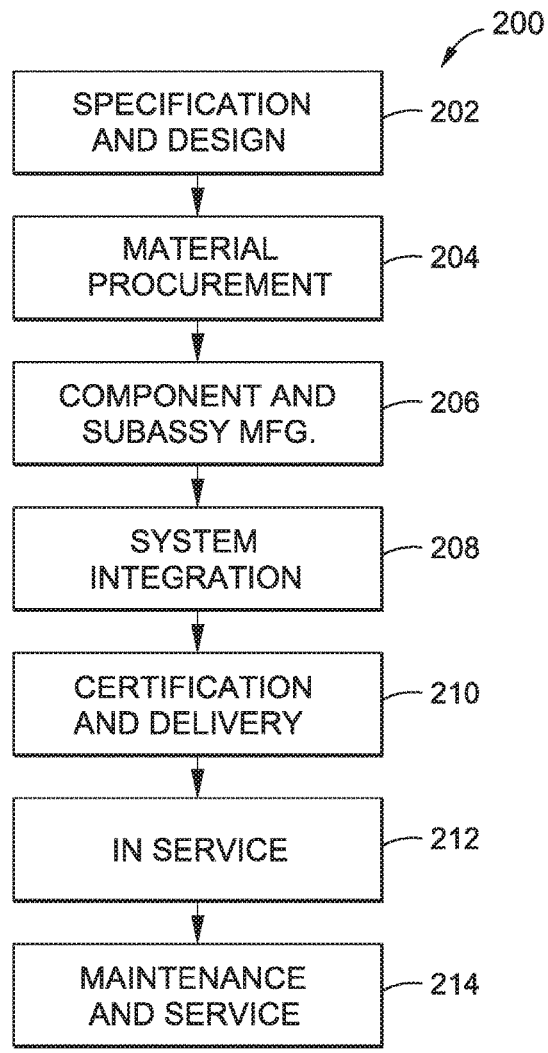
FIG. 10 is an illustration of a flow diagram of an exemplary aircraft manufacturing and service method.
Figure 11:
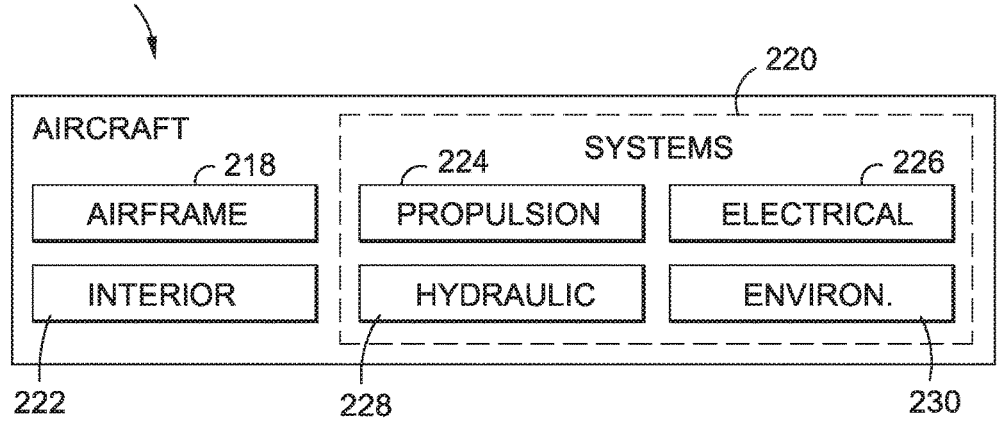
FIG. 11 is an illustration of an exemplary block diagram of an aircraft.

FIG. 10 is an illustration of a flow diagram of an exemplary aircraft manufacturing and service method 200. FIG. 11 is an illustration of an exemplary block diagram of an aircraft 216. Referring to FIGS. 10-11, embodiments of the disclosure may be described in the context of the aircraft manufacturing and service method 200 as shown in FIG. 10, and the aircraft 216 as shown in FIG. 11.

During pre-production, exemplary aircraft manufacturing and service method 200 may include specification and design 202 of the aircraft 216 and material procurement 204. During manufacturing, component and subassembly manufacturing 206 and system integration 208 of the aircraft 216 takes place. Thereafter, the aircraft 216 may go through certification and delivery 210 in order to be placed in service 212. While in service 212 by a customer, the aircraft 216 may be scheduled for routine maintenance and service 214 (which may also include modification, reconfiguration, refurbishment, and other suitable services).

Each of the processes of the aircraft manufacturing and service method 200 may be performed or carried out by a system integrator, a third party, and/or an operator (e.g., a customer). For the purposes of this description, a system integrator may include, without limitation, any number of aircraft manufacturers and major-system subcontractors. A third party may include, without limitation, any number of vendors, subcontractors, and suppliers. An operator may include an airline, leasing company, military entity, service organization, and other suitable operators.

As shown in FIG. 11, the aircraft 216 produced by the exemplary aircraft manufacturing and service method 200 may include an airframe 218 with a plurality of systems 220 and an interior 222. Examples of the plurality of systems 220 may include one or more of a propulsion system 224, an electrical system 226, a hydraulic system 228, and an environmental system 230. Any number of other systems may be included. Although an aerospace example is shown, the principles of the disclosure may be applied to other industries, such as the automotive industry.

Methods and systems embodied herein may be employed during any one or more of the stages of the aircraft manufacturing and service method 200. For example, components or subassemblies corresponding to component and subassembly manufacturing 206 may be fabricated or manufactured in a manner similar to components or subassemblies produced while the aircraft 216 is in service 212. Also, one or more apparatus embodiments, method embodiments, or a combination thereof, may be utilized during component and subassembly manufacturing 206 and system integration 208, for example, by substantially expediting assembly of or reducing the cost of the aircraft 216. Similarly, one or more of apparatus embodiments, method embodiments, or a combination thereof, may be utilized while the aircraft 216 is in service 212, for example and without limitation, to maintenance and service 214.

Disclosed embodiments of the leading edge systems 10 (see FIGS. 1-6C. 7A-7B), 10a (see FIG. 1-3C, 7A), 10b (see FIGS. 4-6C, 7B), and the method 100 (see FIG. 9) provide for easy and quick replacement and repair of any damaged portions of the removable modules 40 (see FIGS. 2A, 5A) of leading edges 14 (see FIGS. 1, 4), and provide for easy and quick maintenance of the removable modules 40 (see FIGS. 2A, 5A) of leading edges 14 (see FIGS. 1, 4). As compared to known systems and methods of repairing or replacing damaged portions of the leading edges of aerospace vehicles, such as spacecraft or aircraft, and maintenance of such leading edges, the disclosed leading edge systems 10 (see FIGS. 1-6C, 7A-7B), 10a (see FIG. 1-3C, 7A), 10b (see FIGS. 4-6C, 7B), and method 100 (see FIG. 9) allow for increased repairability and maintenance and decreased down time of the aerospace vehicle 12 (see FIGS. 1, 4, 8) due to the repair or maintenance. Moreover, the removable module 40 (see FIGS. 2A, 5A) of the disclosed leading edge systems 10 (see FIGS. 1-6C, 7A-7B), 10a (see FIG. 1-3C, 7A), 10b (see FIGS. 4-6C, 7B), and the method 100 (see FIG. 9) may be serviced with minimal impact to grounding of the aerospace vehicle 12 (see FIGS. 1, 4, 8), while repair or maintenance is performed. This, in turn, may reduce the overall costs to repair, service, maintain, and operate the aerospace vehicle 12 (see FIGS. 1, 4, 8), and may increase the availability of the aerospace vehicle 12 (see FIGS. 1, 4, 8) for missions or flights.

In addition, disclosed embodiments of the leading edge systems 10 (see FIGS. 1-6C, 7A-7B), 10a (see FIG. 1-3C, 7A), 10b (see FIGS. 4-6C, 7B), and the method 100 (see FIG. 9) with the removable modules 40 (see FIGS. 2B, 5B) and "drop in" nature of the design, simplify assembly and disassembly and modulize the parts of the leading edges 14 (see FIGS. 1, 4), so they may be replaced or swapped out in a matter of days, rather than weeks or months, or longer, as with known systems and methods. Disclosed embodiments of the leading edge systems 10 (see FIGS. 1-6C, 7A-7B), 10a (see FIG. 1-3C, 7A), 10b (see FIGS. 4-6C, 7B), and the method 100 (see FIG. 9) may be used on leading edges 14 (see FIG. 1) of aerospace vehicles 12 (see FIG. 1) that fly at a low speed and low altitude (i.e., at an altitude of 150,000 feet or less), or may be used on leading edges 14 (see FIG. 4) of aerospace vehicles 12 (see FIG. 4) that fly at a very high speed (i.e., hypersonic vehicles that travel at speeds above about Mach 5) and a high altitude (i.e., at an altitude of greater than 150,000 feet, for example, about 295,276 feet (90 kilometers) for hypersonic vehicles).

Further the removable modules 40 (see FIG. 5A) of the disclosed leading edge system 10b (see FIGS. 4-6C, 7B) for aerospace vehicles 12 (see FIGS. 4, 8) configured to travel in space may be replaced or swapped out in space, such as on an orbiting space station, and the aerospace vehicle 12 (see FIGS. 4, 8) with the repaired or replaced removable module 40 (see FIG. 5A) may then return safely to Earth. In particular, disclosed embodiments of the leading edge system 10b (see FIGS. 4-6C, 7B) and method 100 (see FIG. 9) for high temperature, high speed aerospace vehicles 12b (see FIGS. 4, 8), with the removable modules 40 (see FIG. 5B) enable the thermal protection system (TPS), including thermally insulative tiles 80 (see FIGS. 5A, 7B, 8), on such aerospace vehicles, to be easily repaired or replaced.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A leading edge system for an aerospace vehicle, the leading-edge system comprising:
    at least one structural member comprising one of, a spar, a rib, a stringer, and a beam;
    a plurality of removable modules removably attached to the at least one structural member, each removable module comprising:
    a hollow box substructure having a D-box configuration, a plurality of internal sides that are flat, and a back side adjacent an exterior side of the at least one structural member;
    at least one flange portion disposed along a first end of the hollow box substructure; and
    a thermal protection system (TPS) comprising a plurality of thermally insulative ceramic tiles coupled to an exterior of the hollow box substructure, wherein the thermally insulative ceramic tiles withstand high temperatures in a temperature range of from 500° F. (five hundred degrees Fahrenheit) to 2500° F. (two thousand five hundred degrees Fahrenheit);
    a plurality of first attachment elements configured for attaching the at least one flange portion of the removable module to a first end portion of the at least one structural member; and
    a plurality of second attachment elements configured for attaching a second end of the hollow box substructure opposite the at least one flange portion, to a second end portion of the at least one structural member opposite the first end portion, the plurality of second attachment elements being fixed to an extension portion of the at least one structural member.

2. The leading-edge system of claim 1, wherein the aerospace vehicle is configured to travel at an altitude of greater than 350,000 feet, and comprises one of, a spacecraft, a hypersonic vehicle, a re-entry vehicle, and a reusable launch vehicle (RLV).

3. The leading-edge system of claim 1, wherein the hollow box substructure further comprises one or more substructure stiffeners disposed within an interior of the hollow box substructure.

4. The leading-edge system of claim 1, wherein the plurality of first attachment elements each comprises one of, a fastener, and a bolt.

5. The leading-edge system of claim 1, wherein the plurality of second attachment elements each comprises a dagger pin and a dagger pin nut.

6. The leading edge system of claim 1, wherein the D-box configuration comprises an angled configuration.

7. The leading edge system of claim 1, wherein the thermally insulative ceramic tiles comprise thermally insulative silica ceramic tiles.

8. The leading edge system of claim 1, wherein the hollow box substructure further comprises a flow inhibiting barrier attached to an interior central portion of the hollow box substructure, and forming at least two separate volumes within the hollow box sub structure.

9. A leading edge system for an aerospace vehicle, the leading edge system comprising:
    at least one structural member comprising one of, a spar, a rib, a stringer, and a beam;
    a plurality of removable modules removably attached to the at least one structural member, each removable module comprising:
    a hollow box substructure having a D-box configuration, a plurality of internal sides that are flat, and a flow inhibiting barrier attached to an interior central portion of the hollow box substructure, the flow inhibiting barrier forming two separate volumes within the hollow box substructure, the hollow box substructure having a back side adjacent an exterior side of the at least one structural member;
    at least one flange portion disposed along a first end of the hollow box substructure; and
    a thermal protection system (TPS) comprising at least a plurality of thermally insulative ceramic tiles coupled to an exterior of the hollow box substructure, wherein the thermally insulative ceramic tiles withstand high temperatures in a temperature range of from 500° F. (five hundred degrees Fahrenheit) to 2500° F. (two thousand five hundred degrees Fahrenheit);
    a plurality of first attachment elements configured for attaching the at least one flange portion of the removable module to a first end portion of the at least one structural member; and
    a plurality of second attachment elements configured for attaching a second end of the hollow box substructure opposite the at least one flange portion, to a second end portion of the at least one structural member opposite the first end portion, the plurality of second attachment elements being fixed to an extension portion of the at least one structural member.

10. The leading edge system of claim 9, wherein the aerospace vehicle is configured to travel at an altitude of greater than 350,000 feet, and comprises one of a spacecraft, a hypersonic vehicle, a re-entry vehicle, and a reusable launch vehicle (RLV).

11. The leading edge system of claim 9, wherein the D-box configuration comprises an angled configuration.

12. The leading edge system of claim 9, wherein the plurality of first attachment elements each comprises one of, a fastener, and a bolt, and wherein the plurality of second attachment elements each comprises a dagger pin and a dagger pin nut.

13. The leading edge system of claim 9, wherein the thermal protection system (TPS) further comprises insulation material adjacent one or more wing skins of the aerospace vehicle, a first thermal barrier element coupled between adjacent hollow box substructures, a second thermal barrier element coupled to the structural member, and one or more strain isolation pads coupled between the exterior of the hollow box substructure and the plurality of thermally insulative ceramic tiles.

14. The leading edge system of claim 9, wherein the plurality of thermally insulative ceramic tiles comprise one or more tile openings each filled with an insert element configured to cover and protect each of the plurality of first attachment elements.

15. A method of assembling a leading edge system for an aerospace vehicle, the method comprising the steps of:
assembling a plurality of removable modules, each removable module comprising:
a hollow box substructure having a D-box configuration with a plurality of internal sides that are flat;
a first end having at least one flange portion with a plurality of flange attachment openings;
a second end having a plurality of substructure second end attachment openings; and
a thermal protection system (TPS) comprising a plurality of thermally insulative ceramic tiles coupled to an exterior of the hollow box substructure, wherein the thermally insulative ceramic tiles withstand high temperatures in a temperature range of from 500° F. (five hundred degrees Fahrenheit) to 2500° F. (two thousand five hundred degrees Fahrenheit);
providing at least one structural member disposed in the aerospace vehicle, the at least one structural member comprising one of, a spar, a rib, a stringer, and a beam, and the at least one structural member having a first end portion with a plurality of first end attachment openings, and a second end portion having an extension portion with a plurality of extension portion attachment openings, wherein the hollow box substructure has a back side adjacent an exterior side of the at least one structural member;
providing a plurality of first attachment elements, and a plurality of second attachment elements;
coupling the second end of each hollow box substructure to the second end portion of the at least one structural member, by inserting each of the plurality of second attachment elements through each of the plurality of extension portion attachment openings aligned with each of the plurality of substructure second end attachment openings, the plurality of second attachment elements being fixed to an extension portion of the at least one structural member;
fastening the first end of each hollow box substructure to the first end portion of the at least one structural member, by inserting each of the plurality of first attachment elements through each of the plurality of flange attachment openings aligned with each of the plurality of first end attachment openings; and
obtaining the leading edge system for the aerospace vehicle, wherein each of the plurality of removable modules is separately removable and replaceable.

16. The method of claim 15, wherein assembling the plurality of removable modules further comprises assembling the plurality of removable modules with the D-box configuration comprising an angled configuration.

17. The method of claim 15, wherein providing the plurality of first attachment elements and the plurality of second attachment elements comprises providing the plurality of first attachment elements each comprising one of, a fastener, and a bolt, and providing the plurality of second attachment elements each comprising a dagger pin and a dagger pin nut.

18. The method of claim 15, wherein assembling the plurality of removable modules further comprises assembling the plurality of removable modules comprising the TPS with the plurality of thermally insulative ceramic tiles comprising one or more tile openings, each filled with an insert element configured to cover and protect each of the plurality of first attachment elements.

19. The method of claim 15, wherein assembling the plurality of removable modules further comprises attaching a flow inhibiting barrier to an interior central portion of the hollow box substructure, and forming at least two separate volumes within the hollow box substructure.

20. The method of claim 15, wherein assembling the plurality of removable modules further comprises assembling the plurality of removable modules comprising the TPS with insulation material adjacent one or more wing skins of the aerospace vehicle, a first thermal barrier element coupled between adjacent hollow box substructures, a second thermal barrier element coupled to the structural member, and one or more strain isolation pads coupled between the exterior of the hollow box substructure and the plurality of thermally insulative ceramic tiles.

21. The method of claim 15, wherein the aerospace vehicle is configured to travel at an altitude of greater than 350,000 feet, and comprises one of a spacecraft, a hypersonic vehicle, a re-entry vehicle, and a reusable launch vehicle (RLV).

* * * * *

UNITED STATES PATENT AND TRADEMARK OFFICE
CERTIFICATE OF CORRECTION

PATENT NO. : 10,266,248 B2
APPLICATION NO. : 15/215559
DATED : April 23, 2019
INVENTOR(S) : Daniel C. Stanley et al.

Page 1 of 1

It is certified that error appears in the above-identified patent and that said Letters Patent is hereby corrected as shown below:

In the Claims (1) Column 21 (Line 37), Claim 1, Line 2: Please replace "leading-edge" with "leading edge".

(2) Column 22, Claim 2, Line 1: Please replace "leading-edge" with "leading edge".

(3) Column 22 (Line 6), Claim 3, Line 1: Please replace "leading-edge" with "leading edge".

(4) Column 22 (Line 10), Claim 4, Line 1: Please replace "leading-edge" with "leading edge".

(5) Column 22 (Line 13), Claim 5, Line 1: Please replace "leading-edge" with "leading edge".

Signed and Sealed this
Thirtieth Day of July, 2019

Andrei Iancu
*Director of the United States Patent and Trademark Office*